(12) United States Patent
Wilson et al.

(10) Patent No.: US 6,982,697 B2
(45) Date of Patent: Jan. 3, 2006

(54) SYSTEM AND PROCESS FOR SELECTING OBJECTS IN A UBIQUITOUS COMPUTING ENVIRONMENT

(75) Inventors: Andrew Wilson, Seattle, WA (US); Steven A. N. Shafer, Seattle, WA (US); Daniel Wilson, Pittsburgh, PA (US)

(73) Assignee: Microsoft Corporation, Redmond, WA (US)

( * ) Notice: Subject to any disclaimer, the term of this patent is extended or adjusted under 35 U.S.C. 154(b) by 575 days.

(21) Appl. No.: 10/160,692

(22) Filed: May 31, 2002

(65) Prior Publication Data

US 2003/0193572 A1 Oct. 16, 2003

Related U.S. Application Data

(60) Provisional application No. 60/355,368, filed on Feb. 7, 2002.

(51) Int. Cl.
*G09G 5/00* (2006.01)
*H04N 7/14* (2006.01)

(52) U.S. Cl. ..................... 345/156; 345/169; 348/14.05
(58) Field of Classification Search ......... 345/156–159, 345/162, 165–169; 348/14.01–14.05
See application file for complete search history.

(56) References Cited

U.S. PATENT DOCUMENTS

| | | | | |
|---|---|---|---|---|
| 5,528,263 A | * | 6/1996 | Platzker et al. | 345/156 |
| 5,598,523 A | * | 1/1997 | Fujita | 345/840 |
| 5,703,623 A | * | 12/1997 | Hall et al. | 345/158 |
| 5,719,622 A | * | 2/1998 | Conway | 348/211.8 |
| 6,275,214 B1 | * | 8/2001 | Hansen | 345/158 |
| 6,366,273 B1 | * | 4/2002 | Rosenberg et al. | 345/156 |
| 6,469,633 B1 | * | 10/2002 | Wachter | 340/825.69 |
| 6,720,949 B1 | * | 4/2004 | Pryor et al. | 345/158 |

OTHER PUBLICATIONS

Masui, T., and I. Siio, Real–world graphical user interface, *Proceedings of the International Symposium on Handheld and Ubiquitous Computing (HUC2000)*, Sep. 2000, pp. 72–84.

Swindells, C., K. Inkpen, J. Dill, M. Tory, That one there! Pointing to establish device identity, *Proceedings of the 15th Annual ACM Symposium on User Interface Software and Technology*, 2002 Paris, pp. 151–160.

(Continued)

*Primary Examiner*—Regina Liang
*Assistant Examiner*—Duc Q Dinh
(74) *Attorney, Agent, or Firm*—Lyon & Harr, LLP; Richard T. Lyon

(57) ABSTRACT

A system and process for selecting objects in an ubiquitous computing environment where various electronic devices are controlled by a computer via a network connection and the objects are selected by a user pointing to them with a wireless RF pointer. By a combination of electronic sensors onboard the pointer and external calibrated cameras, a host computer equipped with an RF transceiver decodes the orientation sensor values transmitted to it by the pointer and computes the orientation and 3D position of the pointer. This information, along with a model defining the locations of each object in the environment that is associated with a controllable electronic component, is used to determine what object a user is pointing at so as to select that object for further control actions.

43 Claims, 16 Drawing Sheets

OTHER PUBLICATIONS

Aimone, C., R. Fung, A. Khisti, M. Varia. The Head Mounted Control System. University of Toronto CSIDC Competition Submission, May 2001.

Fisher, R.B., A.P. Ashbrook, C. Robertson, N. Werghi, A Low–Cost Range Finder using a Visually Located, Structured Light Source, Division of Informatics, Edinburgh University.

Jojic, N., B. Brummitt, B. Meyers, S. Harris, and T.Huang, Estimation of Pointing Parameters in Dense disparity Maps. In IEEE Intl. Conf. on Automatic face and Gesture Recognition, (Grenbole, France, 2000).

Olsen, D.R.J., T. Nielsen, Laser Pointer Interaction. In Proceedings CHI'2001:Human Factors in Computing Systems, (Seattle, 2001), 17–22.

Oviatt, S.L. Taming Speech Recognition Errors Within a Multimodal Interface. Communications of the ACM, 43(9). 45–51.

Pearl, J. Probabilistic Reasoning in Intelligent Systems. Morgan Kaufmann, San Mateo, California, 1988.

Priyantha, N.B., A. Chakraborty, H. Balakrishnan, The Cricket Location–Support System. In Proceedings $6^{th}$ ACM MOBICOM, (Boston, MA, 2000).

Rabiner, L.R. and B–H. Juang., An Introduction to Hidden Markov Models. IEEE ASSP Magazine (Jan. 1986) 4–15.

Randell, C., and Henk Muller. Low Cost Indoor Positioning System. In Ubicomp 2001:Ubiquitous Computing, (Atlanta, Georgia, 2001), Springer–Verlag, 42–48.

* cited by examiner

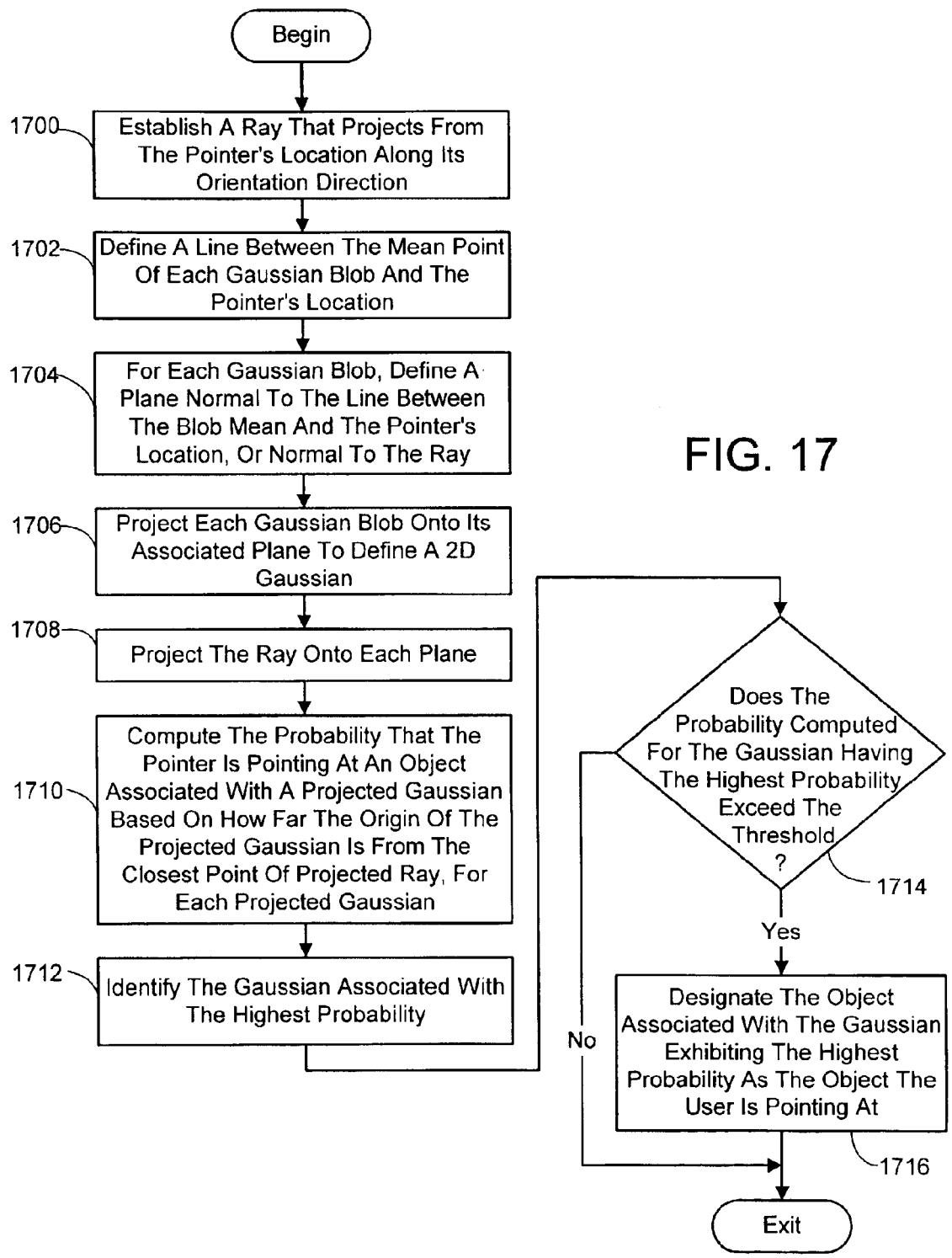

SYSTEM AND PROCESS FOR SELECTING OBJECTS IN A UBIQUITOUS COMPUTING ENVIRONMENT

CROSS-REFERENCE TO RELATED APPLICATIONS

This application claims the benefit of a previously filed provisional patent application Ser. No. 60/355,368, filed on Feb. 7, 2002.

BACKGROUND

1. Technical Field

The invention is related to selecting objects in a ubiquitous computing environment where various electronic devices are controlled by a computer via a network connection, and more particularly to a system and process for selecting objects within the environment by a user pointing to the object with a wireless pointing device.

2. Background Art

Increasingly our environment is populated with a multitude of intelligent devices, each specialized in function. The modern living room, for example, typically features a television, amplifier, DVD player, lights, and so on. In the near future, we can look forward to these devices becoming more inter-connected, more numerous and more specialized as part of an increasingly complex and powerful integrated intelligent environment. This presents a challenge in designing good user interfaces.

For example, today's living room coffee table is typically cluttered with multiple user interfaces in the form of infrared (IR) remote controls. Often each of these interfaces controls a single device. Tomorrow's intelligent environment presents the opportunity to present a single intelligent user interface (UI) to control many such devices when they are networked. This UI device should provide the user a natural interaction with intelligent environments. For example, people have become quite accustomed to pointing at a piece of electronic equipment that they want to control, owing to the extensive use of IR remote controls. It has become almost second nature for a person in a modern environment to point at the object he or she wants to control, even when it is not necessary. Take the small radio frequency (RF) key fobs that are used to lock and unlock most automobiles in the past few years as an example. Inevitably, a driver will point the free end of the key fob toward the car while pressing the lock or unlock button. This is done even though the driver could just have well pointed the fob away from the car, or even pressed the button while still in his or her pocket, owing to the RF nature of the device. Thus, a single UI device, which is pointed at electronic components or some extension thereof (e.g., a wall switch to control lighting in a room) to control these components, would represent an example of the aforementioned natural interaction that is desirable for such a device.

There are some so-called "universal" remote controls on the market that are preprogrammed with the known control protocols of a litany of electronic components, or which are designed to learn the command protocol of an electronic component. Typically, such devices are limited to one transmission scheme, such as IR or RF, and so can control only electronic components operating on that scheme. However, it would be desirable if the electronic components themselves were passive in that they do not have to receive and process commands from the UI device directly, but would instead rely solely on control inputs from the aforementioned network. In this way, the UI device does not have to differentiate among various electronic components, say by recognizing the component in some manner and transmitting commands using some encoding scheme applicable only to that component, as is the case with existing universal remote controls.

Of course, a common control protocol could be implemented such that all the controllable electronic components within an environment use the same control protocol and transmission scheme. However, this would require all the electronic components to be customized to the protocol and transmission scheme, or to be modified to recognize the protocol and scheme. This could add considerably to the cost of a "single UI-controlled" environment. It would be much more desirable if the UI device could be used to control any networked group of new or existing electronic components regardless of remote control protocols or transmission schemes the components were intended to operate under.

It is noted that in the preceding paragraphs, as well as in the remainder of this specification, the description refers to various individual publications identified by a numeric designator contained within a pair of brackets. For example, such a reference may be identified by reciting, "reference [1]" or simply "[1]". Multiple references will be identified by a pair of brackets containing more than one designator, for example, [2, 3]. A listing of references including the publications corresponding to each designator can be found at the end of the Detailed Description section.

SUMMARY

The present invention is directed toward a system and process that provides a remote control UI device that is capable of controlling a group of networked electronic components regardless of any control protocols or transmission schemes under which they operate. In addition, the UI device of the present system and process is able to control the electronic components without having to directly differentiate among the components or employ a myriad of different control protocols and transmission schemes. And in order to provide a natural interaction experience, the present system is operated by having the user point at the electronic component (or an extension thereof that he or she wishes to control.

The system and process according to the present invention provides a remote control UI device that can be simply pointed at objects in an ubiquitous computing environment that are associated in some way with controllable, networked electronic components, so as to select that object for controlling via the network. This can for example involve pointing the UI device at a wall switch and pressing a button on the device to turn a light operated by the switch on or off. The idea is to have a UI device so simple that it requires no particular instruction or special knowledge on the part of the user.

In general, the system includes the aforementioned remote control UI device in the form of a wireless RF pointer, which includes a radio frequency (RF) transceiver and various orientation sensors. The outputs of the sensors are periodically packaged as orientation messages and transmitted using the RF transceiver to a base station, which also has a RF transceiver to receive the orientation messages transmitted by the pointer. There is also a pair of digital video cameras each of which is located so as to capture images of the environment in which the pointer is operating from different viewpoints. A computer, such as a PC, is connected to the base station and the video cameras. Orientation messages received by the base station from the pointer are forwarded to the computer, as are images captured by the video cameras. The computer is employed to compute the orientation and location of the pointer using the orientation messages and captured images. The orientation and location of the pointer is in turn used to determine if the pointer is being pointed at an object in the environment that is controllable by the computer via a network connection. If it is, the object is selected.

The pointer specifically includes a case having a shape with a defined pointing end, a microcontroller, the aforementioned RF transceiver and orientation sensors which are connected to the microcontroller, and a power supply (e.g., batteries) for powering these electronic components. In the tested versions of the pointer, the orientation sensors included at least, an accelerometer that provides separate x-axis and y-axis orientation signals, and a magnetometer that provides separate x-axis, y-axis and z-axis orientation signals. These electronics were housed in a case that resembled a wand.

The pointer's microcontroller packages and transmits orientation messages at a prescribed rate. While the microcontroller could be programmed to accomplish this task by itself, a command-response protocol was employed in tested versions of the system. This entailed the computer periodically instructing the pointer's microcontroller to package and transmit an orientation message by causing the base station to transmit a request for the message to the pointer at the prescribed rate. This prescribed rate could for example be approximately 50 times per second as it was in tested versions of the system.

As indicated previously, the orientation messages generated by the pointer include the outputs of the sensors. To this end, the pointer's microcontroller periodically reads and stores the outputs of the orientation sensors. Whenever a request for an orientation message is received (or it is time to generate such a message if the pointer is programmed to do so without a request), the microcontroller includes the last-read outputs from the accelerometer and magnetometer in the orientation message.

The pointer also includes other electronic components such as a user activated switch or button, and a series of light emitting diodes (LEDs). The user-activated switch, which is also connected to the microcontroller, is employed for the purpose of instructing the computer to implement a particular function, such as will be described later. To this end, the state of the switch in regard to whether it is activated or deactivated at the time an orientation message is packaged is included in that message for transmission to the computer. The series of LEDs includes a pair of differently-colored, visible spectrum LEDs, which are connected to the microcontroller, and which are visible from the outside of the pointer's case when lit. These LEDs are used to provide status or feedback information to the user, and are controlled via instructions transmitted to the pointer by the computer.

The foregoing system is used to select an object by having the user simply point to the object with the pointer. This entails the computer first inputting the orientation messages transmitted by the pointer. For each message received, the computer derives the orientation of the pointer in relation to a predefined coordinate system of the environment in which the pointer is operating using the orientation sensor readings contained in the message. In addition, the video output from the video cameras is used to ascertain the location of the pointer at a time substantially contemporaneous with the generation of the orientation message and in terms of the predefined coordinate system. Once the orientation and location of the pointer are computed, they are used to determine whether the pointer is being pointed at an object in the environment that is controllable by the computer. If so, then that object is selected for future control actions.

The computer derives the orientation of the pointer from the orientation sensor readings contained in the orientation message as follows. First, the accelerometer and magnetometer output values contained in the orientation message are normalized. Angles defining the pitch of the pointer about the x-axis and the roll of the device about the y-axis are computed from the normalized outputs of the accelerometer. The normalized magnetometer output values are then refined using these pitch and roll angles. Next, previously established correction factors for each axis of the magnetometer, which relate the magnetometer outputs to the predefined coordinate system of the environment, are applied to the associated refined and normalized outputs of the magnetometer. The yaw angle of the pointer about the z axis is computed using the refined magnetometer output values. The computed pitch, roll and yaw angles are then tentatively designated as defining the orientation of the pointer at the time the orientation message was generated. It is next determined whether the pointer was in a right-side up or up-side down position at the time the orientation message was generated. If the pointer was in the right-side up position, the previously computed pitch, roll and yaw angles are designated as the defining the finalized orientation of the pointer. However, if it is determined that the pointer was in the up-side down position at the time the orientation message was generated, the tentatively designated roll angle is corrected accordingly, and then the pitch, yaw and modified roll angle are designated as defining the finalized orientation of the pointer. In the foregoing description, it is assumed that the accelerometer and magnetometer of the pointer are oriented such that their respective first axis corresponds to the x-axis which is directed laterally to a pointing axis of the pointer and their respective second axis corresponds to the y-axis which is directed along the pointing axis of the pointer, and the third axis of the magnetometer correspond to the z-axis which is directed vertically upward when the pointer is positioned right-side up with the x and y axes lying in a horizontal plane.

The computer derives the location of the pointer from the video output of the video cameras as follows. There is an infrared (IR) LED connected to the microcontroller that is able to emit IR light outside the pointer's case when lit: The microcontroller causes the IR LEDs to flash. In addition, the aforementioned pair of digital video cameras each have an IR pass filter that results in the video image frames capturing only IR light emitted or reflected in the environment toward the camera, including the flashing from the pointer's IR LED which appears as a bright spot in the video image frames. The microcontroller causes the IR LED to flash at a prescribed rate that is approximately one-half the frame rate of the video cameras. This results in only one of each pair of image frames produced by a camera having the IR LED flashes depicted in it. This allows each pair of frames produced by a camera to be subtracted to produce a difference image, which depicts for the most part only the IR emissions and reflections directed toward the camera which appear in one or the other of the pair of frames but not both (such as the flash from the IR LED of the pointing device). In this way, the background IR in the environment is attenuated and the IR flash becomes the predominant feature in the difference image. The image coordinates of the pixel in the difference image that exhibits the highest intensity is then identified using a standard peak detection procedure. A conventional stereo image technique is then employed to compute the 3D coordinates of the flash for each set of approximately contemporaneous pairs of image frames generated by the pair of cameras using the image coordinates of the flash from the associated difference images and predetermined intrinsic and extrinsic camera parameters. These coordinates represent the location of the pointer (as represented by the location of the IR LED) at the time the video image frames used to compute them were generated by the cameras.

The orientation and location of the pointing device at any given time is used to determine whether the pointing device is being pointed at an object in the environment that is controllable by the computer. In order to do so the computer must know what objects are controllable and where they exist in the environment. This requires a model of the environment. In the present system and process, the location and extent of objects within the environment that are controllable by the computer are modeled using 3D Gaussian blobs defined by a location of the mean of the blob in terms of its environmental coordinates and a covariance. Two different methods have been developed to model objects in the environment.

The first involves the user inputting information identifying the object that is to be modeled. The user then activates the switch on the pointing device and traces the outline of the object. Meanwhile, the computer is running a target training procedure that causes requests for orientation messages to be sent to the pointing device a prescribed request rate. The orientation messages are input as they are received, and for each orientation message, it is determined whether the switch state indictor included in the orientation message indicates that the switch is activated. Whenever it is initially determined that the switch is not activated, the switch state determination action is repeated for each subsequent orientation message received until an orientation message is received which indicates that the switch is activated. At that point, each time it is determined that the switch is activated, the location of the pointing device is ascertained as described previously using the digital video input from the pair of video cameras. When the user is done tracing the outline of the object being modeled, he or she deactivates the switch. The target training process sees this as the switch has been deactivated after having been activated in the immediately preceding orientation message. Whenever, such a condition occurs, the tracing procedure is deemed to be complete and a 3D Gaussian blob representing the object is established using the previously ascertained pointing device locations stored during the tracing procedure.

The second method of modeling objects once again begins by the user inputting information identifying the object that is to be modeled. However, in this case the user repeatedly points the pointer at the object and momentarily activates the switch on the device, each time pointing the device from a different location within the environment. Meanwhile, the computer is running a target training procedure that causes requests for orientation messages to be sent to the pointing device at a prescribed request rate. Each orientation message received from the pointing device is input until the user indicates the target training inputs are complete. For each orientation message input, it is determined whether the switch state indicator contained therein indicates that the switch is activated. Whenever it is determined that the switch is activated, the orientation of the pointing device is computed as described previously using orientation sensor readings also included in the orientation message. In addition, the location of the pointing device is ascertained using the inputted digital video from the pair of video cameras. The computed orientation and location values are stored. Once the user indicates the target training inputs are complete, the location of the mean of a 3D Gaussian blob that will be used to represent the object being modeled is computed from the pointing device's stored orientation and location values. The covariance of the Gaussian blob is then obtained in one of various ways. For example, it can be a prescribed covariance, a user input covariance, or the covariance can be computed by adding a minimum covariance to the spread of the intersection points of rays defined by the pointing device's stored orientation and location values.

With a Gaussian blob model of the environment in place, the orientation and location of the pointing device can be is used to determine whether the pointing device is being pointed at an object in the environment that is controllable by the computer. In one version of this procedure, for each Gaussian blob in the model, the blob is projected onto a plane which is normal to either a line extending from the location of the pointing device to the mean of the blob or a ray originating at the location of the pointing device and extending in a direction defined by the orientation of the device. The value of the resulting projected Gaussian blob at a point where the ray intersects the plane is computed. This value represents the probability that the pointing device is pointing at the object associated with the blob under consideration. Next, the probability representing the largest value computed for the Gaussian blobs, if any, is identified. At this point, the object associated with the Gaussian blob from which the largest probability value was derived could be designated as being the object that the pointing device is pointing at. However, an alternate thresholding procedure could be employed instead. In this alternate version, it is first determined whether the probability value identified as the largest exceeds a prescribed minimum probability threshold. Only if the threshold is exceeded is the object associated with the projected Gaussian blob from which the largest probability value was derived designated as being the object that the pointer is pointing at. The minimum probability threshold is chosen to ensure the user is actually pointing at the object and not just near the object without an intent to select it.

In an alternate procedure for determining whether the pointing device is being pointed at an object in the environment that is controllable by the computer, for each Gaussian blob, it is determined whether a ray originating at the location of the pointing device and extending in a direction defined by the orientation of the device intersects the blob. Next, for each Gaussian blob intersected by the ray, it is determined what the value of the Gaussian blob is at a point along the ray nearest the location of the mean of the blob. This value represents the probability that the pointing device is pointing at the object associated with the Gaussian blob. The rest of the procedure is similar to the first method in that the object associated with the Gaussian blob from which the largest probability value was derived could be designated as being the object that the pointing device is pointing at. Or alternately, it is first determined whether the probability value identified as the largest exceeds the prescribed minimum probability threshold. If the threshold is exceeded, only then is the object associated with the projected Gaussian blob from which the largest probability value was derived designated as being the object that the pointing device is pointing at.

DESCRIPTION OF THE DRAWINGS

The specific features, aspects, and advantages of the present invention will become better understood with regard to the following description, appended claims, and accompanying drawings where:

FIG. 13C depicts the difference image derived from a pair of consecutive images generated by the camera that captured the image of FIG. 3A and where FIG. 13D depicts the difference image derived from a pair of consecutive images generated by the camera that captured the image of FIG. 3B. The difference images attenuate background IR leaving the pointer's IR LED flash as the predominant feature of the image.

FIG. 17 depicts a flow chart diagramming a process for determining what object a user is pointing at with the pointer as part of the overall process of FIG. 8.

DESCRIPTION OF THE PREFERRED EMBODIMENTS

In the following description of the preferred embodiments of the present invention, reference is made to the accompanying drawings which form a part hereof, and in which is shown by way of illustration specific embodiments in which the invention may be practiced. It is understood that other embodiments may be utilized and structural changes may be made without departing from the scope of the present invention.

Figure 1:
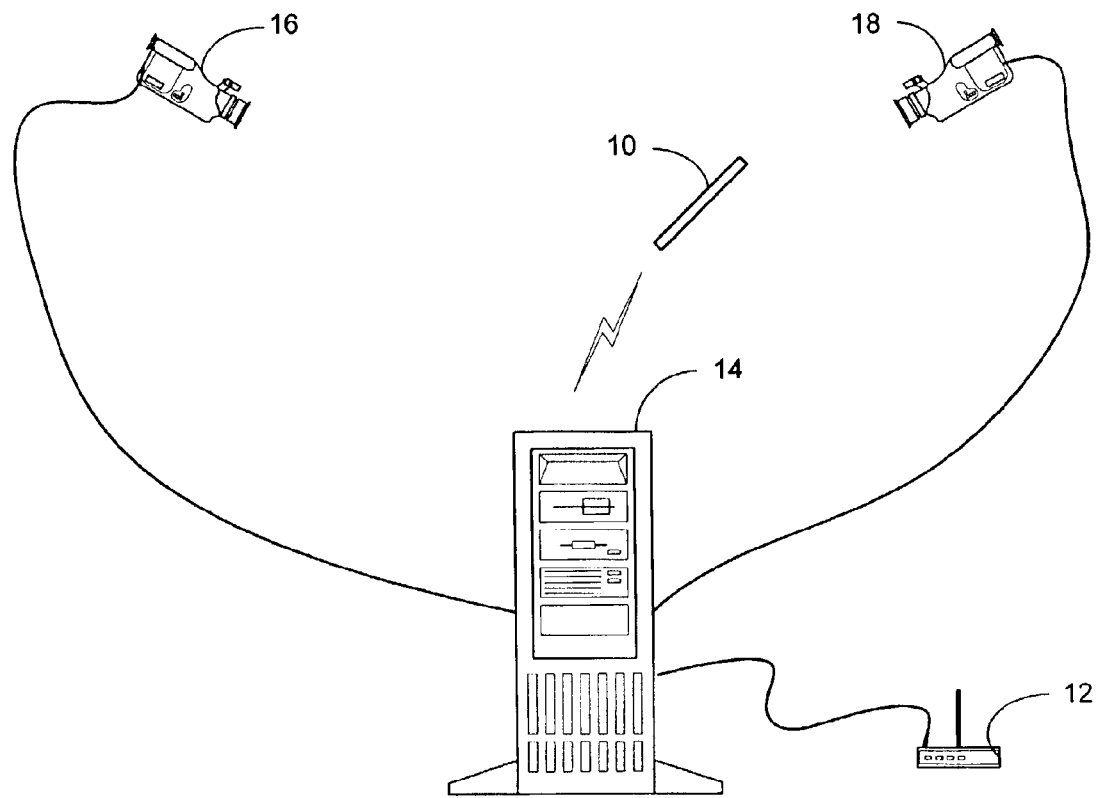
FIG. 1 is a diagram depicting an object selection system according to the present invention.

Referring to FIG. 1, the object selection system according to the present invention includes a wireless pointer 10, which is pointed by a user at an object in the surrounding environment (such as a room) that the user wishes to affect. For example, the user might point the device 10 at a lamp with the intention of turning the lamp on or off. The wireless pointer 10 transmits data messages to a RF transceiver base station 12, which is in communication with a host computer 14, such as a personal computer (PC). In tested versions of the present object selection system, communications between the base station 12 and the host computer 14 were accomplished serially via a conventional RS232 communication interface. However, other communication interfaces can also be employed as desired. For example, the communications could be accomplished using a Universal System Bus (USB), or IEEE 1394 (Firewire) interface, or even a wireless interface. The base station 12 forwards data received from the pointer 10 to the host computer 14 when a data message is received. The host computer 14 then computes the current 3D orientation of the pointer 10 from the aforementioned received data. The process used for this computation will be described in detail later.

The object selection system also includes components for determining the 3D location of the pointer 10. Both the orientation and location of the pointer within the environment in which it is operating are needed to determine where the user is pointing the device. In tested embodiments of the present system these components included a pair of video cameras 16, 18 with infrared-pass filters. These cameras 16, 18 are mounted at separate locations within the environment such that each images the portion of the environment where the user will be operating the pointer 10 from a different viewpoint. A wide angle lens can be used for this purpose if necessary. Each camera 16, 18 is also connected via any conventional wireless or wired pathway to the host computer 14, so as to provide image data to the host computer 14. In tested embodiments of the present system, the communication interface between the each camera 16, 18 and the host computer 14 was accomplished using a wired IEEE 1394 (i.e., Firewire) interface. The process by which the 3D location of the pointer 10 is determined using the image data provided from the cameras 16, 18 will also be discussed in detail later.

Figure 2:
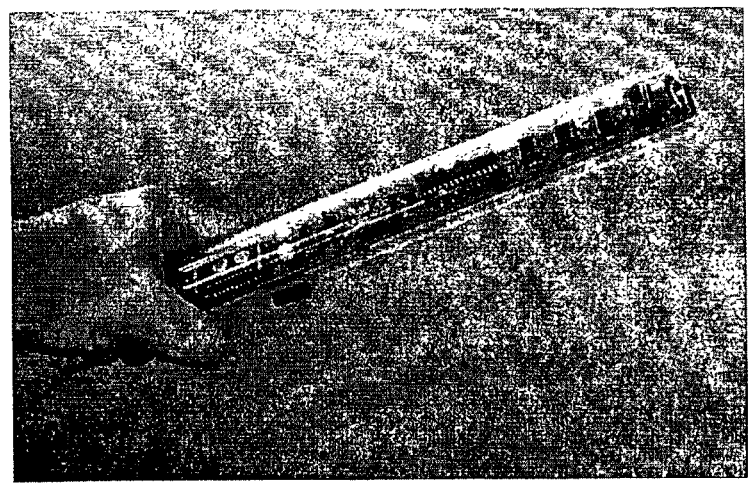
FIG. 2 is an image depicting one version of the wireless RF pointer employed in the object selection system of FIG. 1, where the case is transparent revealing the electronic component within.

The aforementioned wireless pointer is a small hand-held unit that in the tested versions of the object selection system resembled a cylindrical wand, as shown in FIG. 2. However, the pointer can take on many other forms as well. In fact the pointer can take on any shape that is capable of accommodating the internal electronics and external indicator lights and actuators associated with the device—although preferably the chosen shape should be amenable to being pointed with a readily discernable front or pointing end. Some examples of possible alternate shapes for the pointer would include one resembling a remote control unit for a stereo or television, or one resembling an automobile key fob, or one resembling a writing pen.

Figure 3:
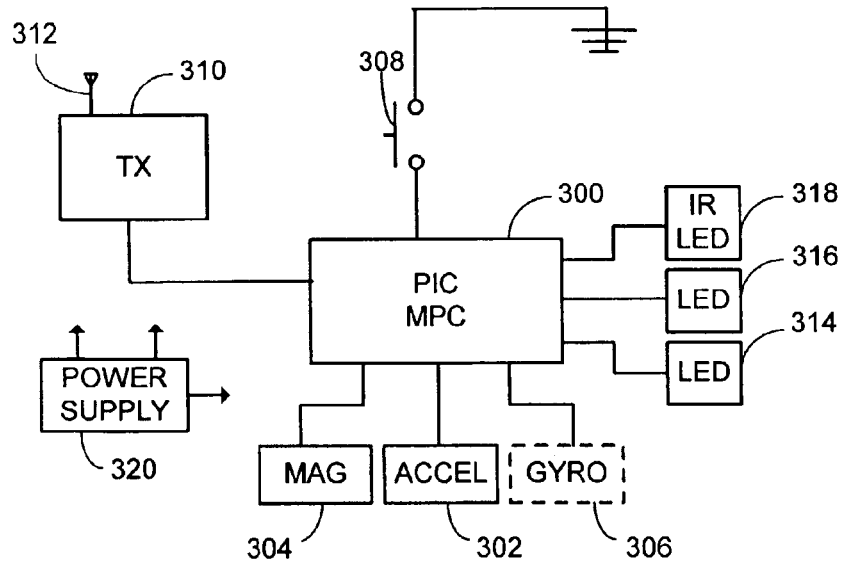
FIG. 3 is a block diagram illustrating the internal components included in one version of the wireless RF pointer employed in the object selection system of FIG. 1.

In general, the wireless pointer is constructed from a case having the desired shape, which houses a number of off-the-shelf electronic components. Referring to the block diagram of FIG. 3, the general configuration of these electronic components will be described. The heart of the pointer is a PIC microcontroller 300 (e.g., a PIC 16F873 20 MHz Flash programmable microcontroller), which is connected to several other components. For example, the output of an accelerometer 302, which produces separate x-axis and y-axis signals (e.g., a 2-axis MEMs accelerometer model number ADXL202 manufactured by Analog Devices, Inc. of Norwood Mass.) is connected to the microcontroller 300. The output of a magnetometer 304 (e.g., a 3-axis magnetoresistive permalloy film magnetometer model number HMC1023 manufactured by Honeywell SSEC of Plymouth, Minn.), which produces separate x, y and z axis signals, is also connected to the microcontroller 300, as can be an optional single axis output of a gyroscope 306 (e.g., a 1-axis piezoelectric gyroscope model number ENC-03 manufactured by Murata Manufacturing Co., Ltd. of Kyoto, Japan). The block representing the gyroscope in FIG. 3 has dashed lines to indicate it is an optional component.

There is also at least one manually-operated switch connected to the microcontroller 300. In the tested versions of the wireless pointer, just one switch 308 was included, although more switches could be incorporated depending on what functions it is desired to make available for manual activation or deactivation. The included switch 308 is a push-button switch; however any type of switch could be employed. In general, the switch (i.e., button) 308 is employed by the user to tell the host computer to implement some function. The particular function will be dependent on what part of the object selection system process is currently running on the host computer. For example, the user might depress the button to signal to the host computer that user is pointing at an object he or she wishes to affect (such as turning it on or off if it is an electrical device), when the aforementioned process is in an object selection mode. A transceiver 310 with a small antenna 312 extending therefrom, is also connected to and controlled by the microcontroller 300. In tested versions of the pointer, a 418 MHz, 38.4 kbps bidirectional, radio frequency transceiver was employed.

Additionally, a pair of visible spectrum LEDs 314, 316, is connected to the microcontroller 300. Preferably, these LEDs each emit a different color of light. For example, one of the LEDs 314 could produce red light, and the other 316 could produce green light. The visible spectrum LEDs 314, 316 can be used for a variety of purposes preferably related to providing status or feedback information to the user. In the tested versions of the object selection system, the visible spectrum LEDs 314, 316 were controlled by commands received from the host computer via the base station transceiver. One example of their use involves the host computer transmitting a command via the base station transceiver to the pointer instructing the microcontroller 300 to illuminate the green LED 316 when the device is being pointed at an object that the host computer is capable of affecting, and illuminating the red LED when it is not. In addition to the pair of visible LEDs, there is an infrared (IR) LED 318 that is connected to and controlled by the microcontroller 300. The IR LED can be located at the front or pointing end of the pointer. It is noted that unless the case of the pointer is transparent to visible and/or IR light, the LEDs 314, 316, 318 whose light emissions would be blocked are configured to extend through the case of the pointer so as to be visible from the outside. It is further noted that a vibration unit such as those employed in pagers could be added to the pointer so that the host computer could activate the unit and thereby attract the attention of the user, without the user having to look at the pointer.

A power supply 320 provides power to the above-described components of the wireless pointer. In tested versions of the pointer, this power supply 320 took the form of batteries. A regulator in the power supply 320 converts the battery voltage to 5 volts for the electronic components of the pointer. In tested versions of the pointer about 52 mA was used when running normally, which decreases to 1 mA when the device is in a power saving mode that will be discussed shortly.

Tested versions of the wireless pointer operate on a command-response protocol between the device and the base station. Specifically, the pointer waits for a transmission from the base station. An incoming transmission from the base station is received by the pointer's transceiver and sent to the microcontroller. The microcontroller is pre-programmed with instructions to decode the received messages and to determine if the data contains an identifier that is assigned to the pointer and which uniquely identifies the device. This identifier is pre-programmed into the microcontroller. If such an identifier is found in the incoming message, then it is deemed that the message is intended for the pointer. It is noted that the identifier scheme allows other devices to be contacted by the host computer via the base station. Such devices could even include multiple pointers being operated in the same environment, such as in an office. In the case where multiple pointer are in use in the same environment, the object selection process which will be discussed shortly can be running as multiple copies (one for each pointer) on the same host computer, or could be running on separate host computers. Of course, if there are no other devices operating in the same environment, then the identifier could be eliminated and every message received by the pointer would be assumed to be for it. The remainder of the data message received can include various commands from the host computer, including a request to provided orientation data in a return transmission. In tested versions of the object selection system, a request for orientation data was transmitted 50 times per second (i.e., a rate of 50 Hz). The microcontroller is pre-programmed to recognize the various commands and to take specific actions in response.

Figure 4:
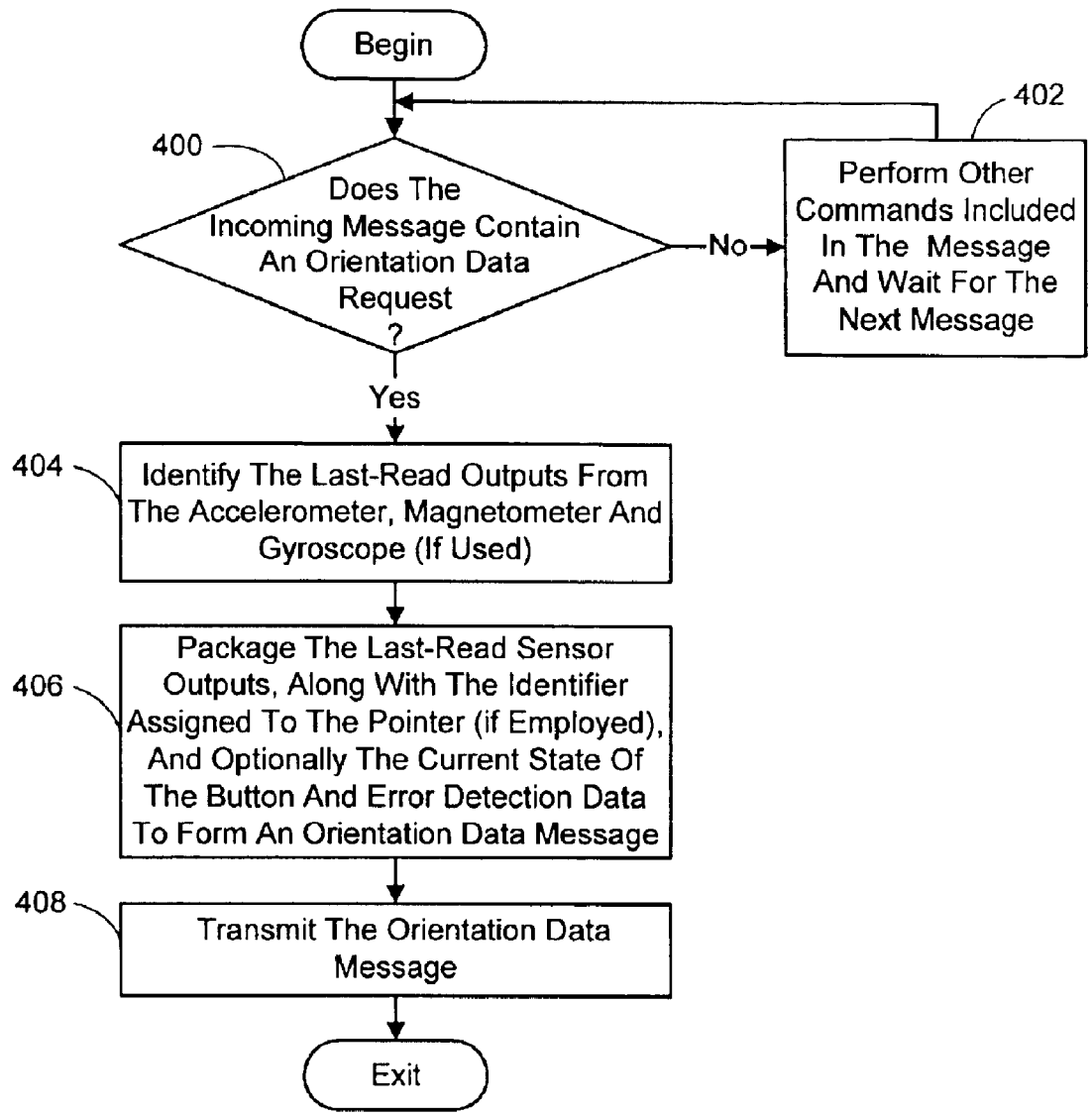
FIG. 4 is a flow chart diagramming a process performed by the pointer to package and transmit orientation data messages.

For example, in the case where an incoming data message to the pointer includes a request for orientation data, the microcontroller would react as follows. Referring to the flow diagram in FIG. 4, the microcontroller first determines if the incoming data message contains an orientation data request command (process action 400). If not, the microcontroller performs any other command included in the incoming data message and waits for the next message to be received from the base station (process action 402). If, however, the microcontroller recognizes an orientation data request command, in process action 404 it identifies the last-read outputs from the accelerometer, magnetometer and optionally the gyroscope (which will hereafter sometimes be referred to collectively as "the sensors"). These output values, along with the identifier assigned to the pointer (if employed), and optionally the current state of the button and error detection data (e.g., a checksum value), are packaged by the microcontroller into an orientation data message (process action 406). The button state is used by the host computer of the system for various purposes, as will be discussed later. The orientation data message is then transmitted via the pointer's transceiver to the base station (process action 408), which passes the data on to the host computer. The aforementioned orientation message data can be packaged and transmitted using any appropriate RF transmission protocol.

It is noted that while tested versions of the object selection system used the above-described polling scheme where the pointer provided the orientation data message in response to a transmitted request, this need not be the case. For example, alternately, the microcontroller of the pointer could be programmed to package and transmit an orientation message on a prescribed periodic basis (e.g., at a 50 Hz rate).

In regard to the aforementioned error detection data, the base station could be programmed to determine if an orientation message received from the pointer is incomplete or corrupted. If so, the message would not be forwarded on to the host computer. Alternatively, the error detection data could be forwarded to the host computer, and the decision as to whether to use or ignore a defective orientation message would be made as part of the object selection process.

Figure 5A:
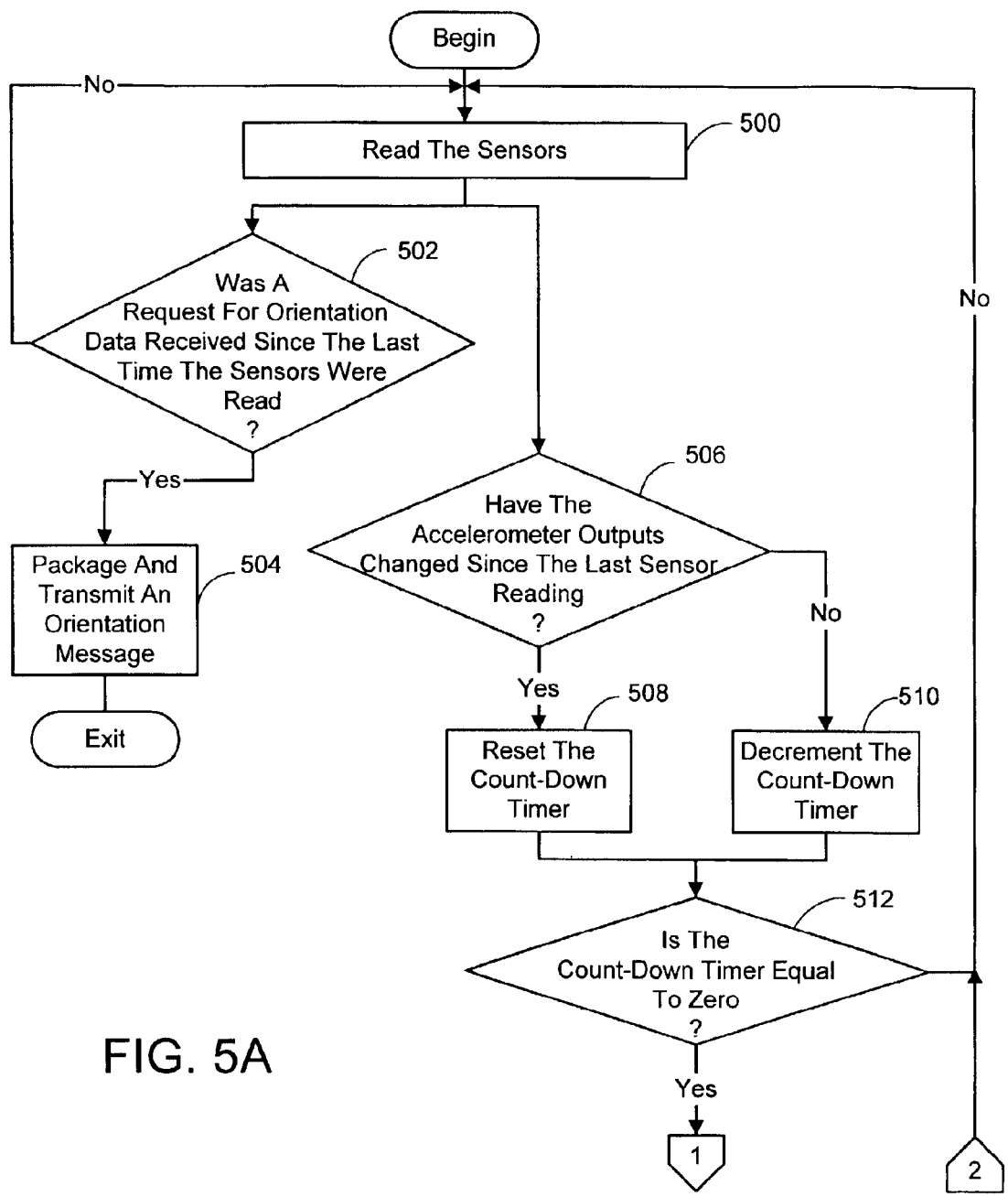
FIGS. 5A–B depict a flow chart diagramming a process for conserving the battery life of the pointer employed in the object selection system of FIG. 1.
Figure 5B:
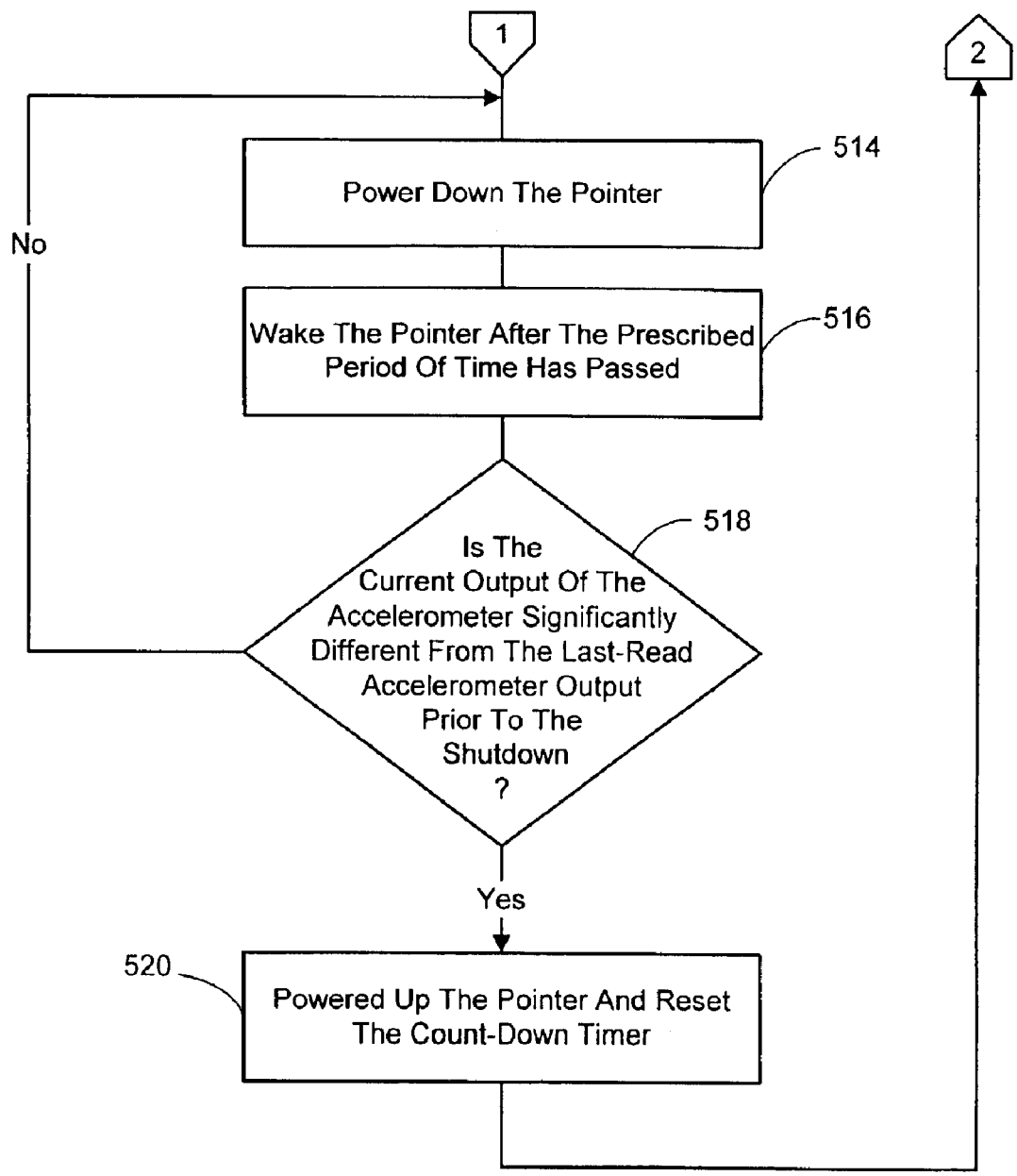

The pointer's microcontroller is also pre-programmed to perform power saving functions in order to extend the life of the batteries. Essentially, this involves determining if the device is in motion, and if not shutting it down. The idea behind the battery saving mode is that if the pointer is not being moved, it is likely the user is not pointing it at an object he or she wishes to affect, and so there is no need for the device to continue normal operations. Any appropriate method for determining whether the pointer is moving can be employed, however in tested embodiments of the pointer, the output of the accelerometer was used. Specifically, referring to FIGS. 5A and B, the microcontroller reads the aforementioned sensors on a periodic basis (process action 500). This is done at a rate faster than the orientation data request rate employed by the overall object selection system. Thus, in tested versions of the system, the microcontroller reads the outputs of the sensors at a rate somewhat faster than 50 Hz. Each time the microcontroller reads the sensor outputs, it checks to see if a request for orientation data has been received since the last time the sensors were read (process action 502). If a request has come in, the previous procedure of packaging and transmitting an orientation data message is performed (process action 504). In addition, each time the sensors are read, the microcontroller determines if the accelerometer outputs have changed since the last sensor reading (process action 506). If the outputs have changed, this is indicative that the pointer is in motion. In such a case, the microcontroller resets a sleep clock in the form of a count-down timer resident in the controller (process action 508). However, if it is determined that the accelerometer output has not changed, then the microcontroller decrements the timer (process action 510). Next, the microcontroller determines if the timer is equal to zero (process action 512). If so, the microcontroller powers down the pointer (process action 514). If the timer is not zero, the sensor reading process continues by repeating process actions 500 through 512, as appropriate. In tested versions of the pointer, the count-down timer was reset to 10 seconds. It was believed that if the device had not been moved in that amount of time, then it probably is not being used, and can be powered down without impact on the user. Of course, other reset periods could also be employed as desired.

Once the pointer is shutdown, normal operations cease with the exception that in process action 516 the microcontroller wakes the device periodically (e.g., every 3 seconds). When the microcontroller wakes the pointer it reads the output from the accelerometer and then compares these readings to the last-read accelerometer output prior to the shutdown to determine if they are different (process action 518). If the new readings are significantly different from the aforementioned prior readings, then the pointer is powered up, the sleep clock is reset, and normal operations resume (process action 520). These actions are performed as it is deemed that the pointer has been moved and is now in use if the accelerometer readings change. If, however, the new readings are not significantly different, then the microcontroller shuts down the pointer once again (process action 514), and repeats process actions 516 through 522, as appropriate. It is noted that the foregoing power saving scheme was so successful in tested versions of the wireless pointer that no power on/off switch was needed on the pointer—although one could be added if desired.

The aforementioned base station used in the present object selection system will now be described. In one version, the base station is a small, stand-alone box with connections for DC power and communications with the PC, respectively, and an external antenna. In tested versions of the object selection system, communication with the PC is done serially via a RS232 communication interface. However, other communication interfaces can also be employed as desired. For example, the PC communications could be accomplished using a Universal System Bus (USB), or IEEE 1394 (Firewire) interface, or even a wireless interface. The antenna is designed to receive 418 MHz radio transmissions from the pointer.

Figure 6:
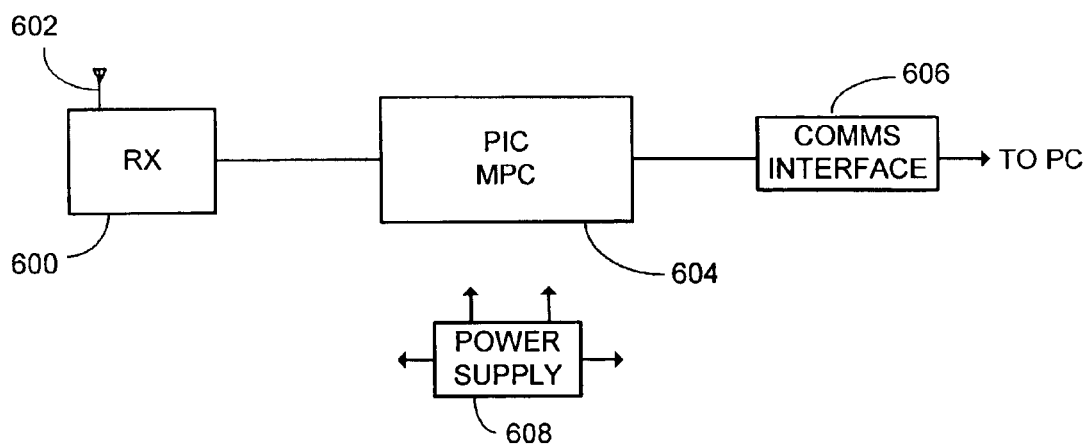
FIG. 6 is a block diagram illustrating the internal components included in one version of the RF base station employed in the object selection system of FIG. 1.

Referring now to the block diagram of FIG. 6, the general construction of the RF transceiver base station will be described. The antenna 602 sends and receives data message signals. In the case of receiving a data message from the pointer, the radio frequency transceiver 600 demodulates the received signal for input into a PIC microcontroller 604. The microcontroller 604 provides an output representing the received data message each time one is received, as will be described shortly. A communication interface 606 converts microcontroller voltage levels to levels readable by the host computer. As indicated previously, the communication interface in tested versions of the base station converts the microcontroller voltage levels to RS232 voltages. Power for the base station components is provided by power supply 608, which could also be battery powered or take the form of a separate mains powered AC circuit.

It is noted that while the above-described version of the base station is a stand-alone unit, this need not be the case. The base station could be readily integrated into the host computer itself. For example, the base station could be configured as an expansion card which is installed in an expansion slot of the host computer. In such a case only the antenna need be external to the host computer.

Figure 7:
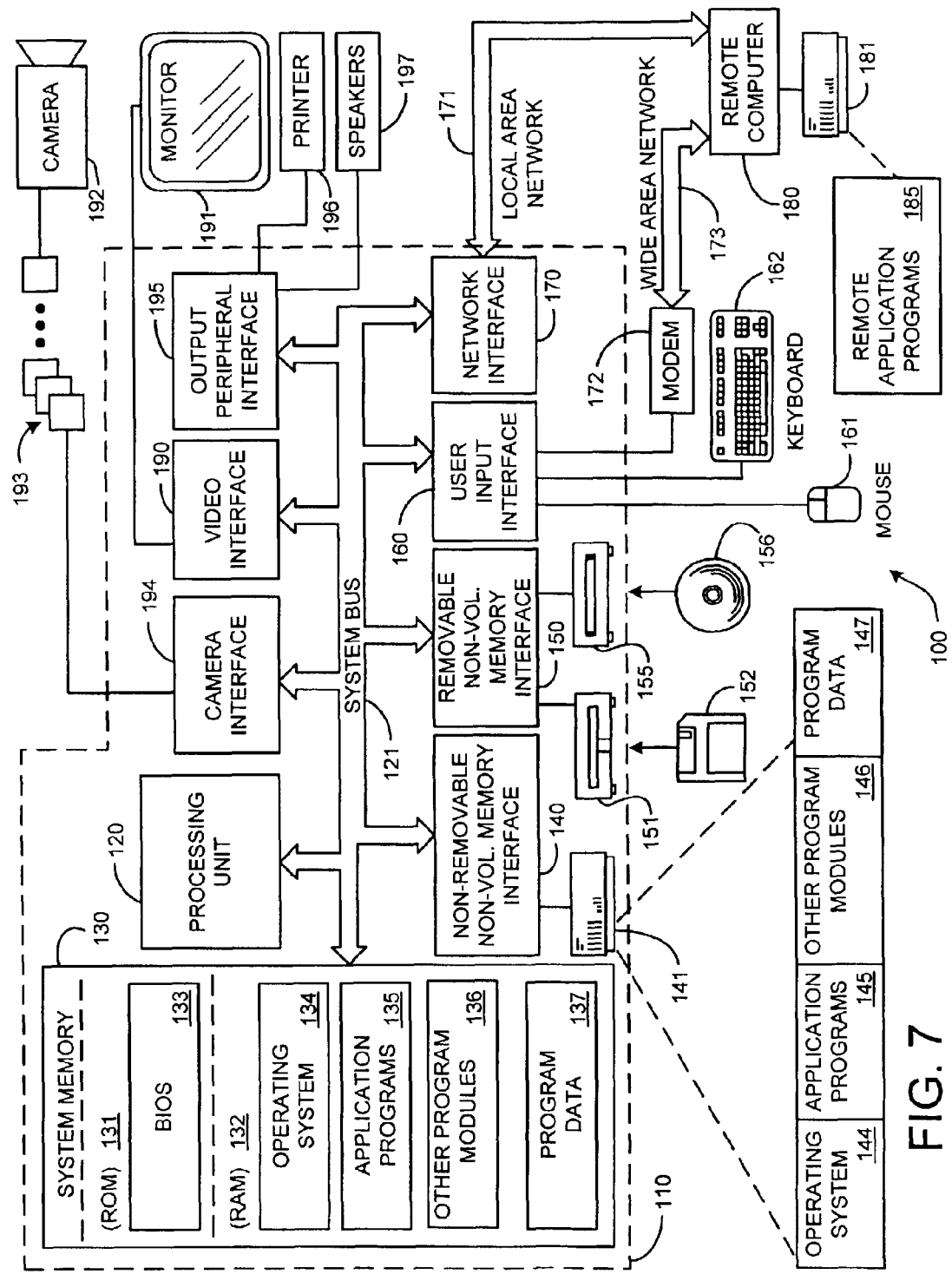
FIG. 7 is a diagram depicting a general purpose computing device constituting an exemplary system for implementing the host computer of the present invention.

The base station is connected to the host computer, as described previously. Whenever a orientation data message is received from the pointer it is transferred to the host computer for processing. However, before providing a description of the preferred embodiments of the present invention in regard to this processing, a brief, general description of a suitable computing environment in which this processing may be implemented and of the aforementioned host computer, will be described in more detail. FIG. 7 illustrates an example of a suitable computing system environment 100. The computing system environment 100 is only one example of a suitable computing environment and is not intended to suggest any limitation as to the scope of use or functionality of the invention. Neither should the computing environment 100 be interpreted as having any dependency or requirement relating to any one or combination of components illustrated in the exemplary operating environment 100.

The object selection process is operational with numerous other general purpose or special purpose computing system environments or configurations. Examples of well known computing systems, environments, and/or configurations that may be suitable for use with the invention include, but are not limited to, personal computers, server computers, hand-held or laptop devices, multiprocessor systems, microprocessor-based systems, set top boxes, programmable consumer electronics, network PCs, minicomputers, mainframe computers, distributed computing environments that include any of the above systems or devices, and the like (which are collectively be referred to as computers or computing devices herein).

The object selection process may be described in the general context of computer-executable instructions, such as program modules, being executed by a computer. Generally, program modules include routines, programs, objects, components, data structures, etc. that perform particular tasks or implement particular abstract data types. The invention may also be practiced in distributed computing environments where tasks are performed by remote processing devices that are linked through a communications network. In a distributed computing environment, program modules may be located in both local and remote computer storage media including memory storage devices.

With reference to FIG. 7, an exemplary system for implementing the invention includes a general purpose computing device in the form of a computer 110. Components of computer 110 may include, but are not limited to, a processing unit 120, a system memory 130, and a system bus 121 that couples various system components including the system memory to the processing unit 120. The system bus 121 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

Computer 110 typically includes a variety of computer readable media. Computer readable media can be any available media that can be accessed by computer 110 and includes both volatile and nonvolatile media, removable and non-removable media. By way of example, and not limitation, computer readable media may comprise computer storage media and communication media. Computer storage media includes both volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by computer 110. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer readable media.

The system memory 130 includes computer storage media in the form of volatile and/or nonvolatile memory such as read only memory (ROM) 131 and random access memory (RAM) 132. A basic input/output system 133 (BIOS), containing the basic routines that help to transfer information between elements within computer 110, such as during start-up, is typically stored in ROM 131. RAM 132 typically contains data and/or program modules that are immediately accessible to and/or presently being operated on by processing unit 120. By way of example, and not limitation, FIG. 7 illustrates operating system 134, application programs 135, other program modules 136, and program data 137.

The computer 110 may also include other removable/non-removable, volatile/nonvolatile computer storage media. By way of example only, FIG. 7 illustrates a hard disk drive 141 that reads from or writes to non-removable, nonvolatile magnetic media, a magnetic disk drive 151 that reads from or writes to a removable, nonvolatile magnetic disk 152, and an optical disk drive 155 that reads from or writes to a removable, nonvolatile optical disk 156 such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 141 is typically connected to the system bus 121 through a non-removable memory interface such as interface 140, and magnetic disk drive 151 and optical disk drive 155 are typically connected to the system bus 121 by a removable memory interface, such as interface 150.

The drives and their associated computer storage media discussed above and illustrated in FIG. 7, provide storage of computer readable instructions, data structures, program modules and other data for the computer 110. In FIG. 7, for example, hard disk drive 141 is illustrated as storing operating system 144, application programs 145, other program modules 146, and program data 147. Note that these components can either be the same as or different from operating system 134, application programs 135, other program modules 136, and program data 137. Operating system 144, application programs 145, other program modules 146, and program data 147 are given different numbers here to illustrate that, at a minimum, they are different copies. A user may enter commands and information into the computer 110 through input devices such as a keyboard 162 and pointer 161, commonly referred to as a mouse, trackball or touch pad. Other input devices (not shown) may include a microphone, joystick, game pad, satellite dish, scanner, or the like. These and other input devices are often connected to the processing unit 120 through a user input interface 160 that is coupled to the system bus 121, but may be connected by other interface and bus structures, such as a parallel port, game port or a universal serial bus (USB). A monitor 191 or other type of display device is also connected to the system bus 121 via an interface, such as a video interface 190. In addition to the monitor, computers may also include other peripheral output devices such as speakers 197 and printer 196, which may be connected through an output peripheral interface 195. Further, a camera 163 (such as a digital/electronic still or video camera, or film/photographic scanner) capable of capturing a sequence of images 164 can also be included as an input device to the personal computer 110. While just one camera is depicted, multiple cameras could be included as input devices to the personal computer 110. The images 164 from the one or more cameras are input into the computer 110 via an appropriate camera interface 165. This interface 165 is connected to the system bus 121, thereby allowing the images to be routed to and stored in the RAM 132, or one of the other data storage devices associated with the computer 110. However, it is noted that image data can be input into the computer 110 from any of the aforementioned computer-readable media as well, without requiring the use of the camera 163.

The computer 110 may operate in a networked environment using logical connections to one or more remote computers, such as a remote computer 180. The remote computer 180 may be a personal computer, a server, a router, a network PC, a peer device or other common network node, and typically includes many or all of the elements described above relative to the computer 110, although only a memory storage device 181 has been illustrated in FIG. 7. The logical connections depicted in FIG. 7 include a local area network (LAN) 171 and a wide area network (WAN) 173, but may also include other networks. Such networking environments are commonplace in offices, enterprise-wide computer networks, intranets and the Internet.

When used in a LAN networking environment, the computer 110 is connected to the LAN 171 through a network interface or adapter 170. When used in a WAN networking environment, the computer 110 typically includes a modem 172 or other means for establishing communications over the WAN 173, such as the Internet. The modem 172, which may be internal or external, may be connected to the system bus 121 via the user input interface 160, or other appropriate mechanism. In a networked environment, program modules depicted relative to the computer 110, or portions thereof, may be stored in the remote memory storage device. By way of example, and not limitation, FIG. 7 illustrates remote application programs 185 as residing on memory device 181. It will be appreciated that the network connections shown are exemplary and other means of establishing a communications link between the computers may be used.

Figure 8:
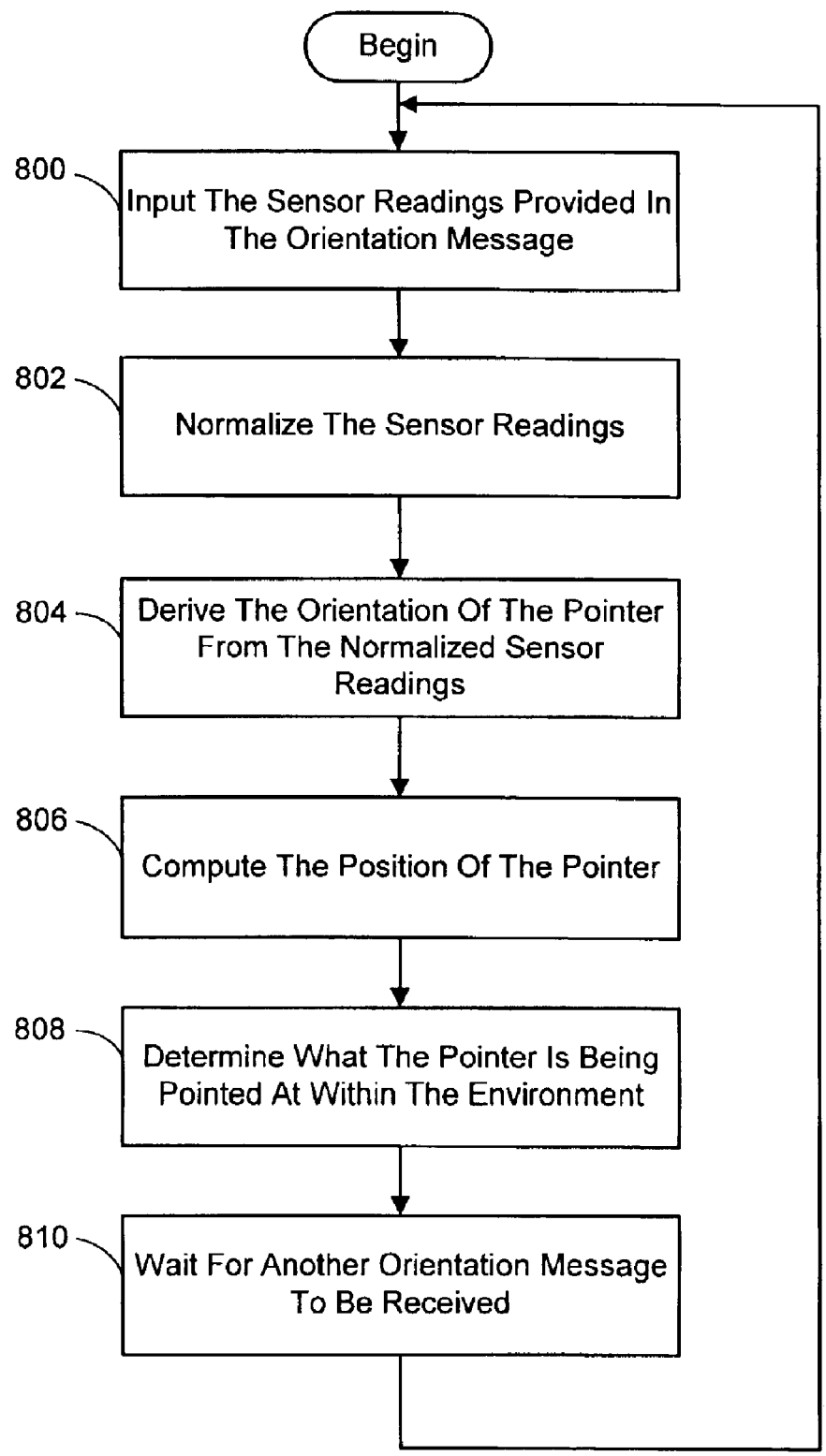
FIG. 8 is a flow chart diagramming an overall process for selecting an object using the object selection system of FIG. 1.

The exemplary operating environment having now been discussed, the remaining part of this description section will be devoted to a description of the program modules embodying the object selection process performed by the host computer. Generally, referring to FIG. 8, the object selection process begins by inputting the raw sensor readings provided in an orientation message forwarded by the base station (process action 800). These sensor readings are normalized (process action 802) based on factors computed in a calibration procedure, and then combined to derive the full 3D orientation of the pointer (process action 804). Then, the 3D location of the pointer in the environment in which it is operating is computed (process action 806). Once the orientation and location of the pointer is known, the object selection process determines what the pointer is being pointed at within the environment (process action 808), so that the object can be affected in some manner. The process then waits for another orientation message to be received (process action 810) and repeats process actions 800 through 810.

Knowing what object a user is pointing at allows the pointer to be used as a user interface (UI) where the user points at objects in the environment and controls the selected object via the button on the device or some other method. For example, if the object is a lamp or piece of electronics equipment, the user might point the pointer at the item so as to select it. The user can then control the selected object, such as turning it on and off by depressing the button on the pointer. This is of course a very simplistic example of how an object can be controlled once selected using the pointer. The processes employed to control a selected object are beyond the scope of the present application, and are instead the subject of a co-pending U.S. patent application entitled "A SYSTEM AND PROCESS FOR CONTROLLING ELECTRONIC COMPONENTS IN A UBIQUITOUS COMPUTING ENVIRONMENT USING MULTIMODAL INTEGRATION", having a Ser. No. of 10/160,659, and a filing date of May 31, 2002. It is in this co-pending application that the optional gyroscope is employed for the purpose of recognizing certain gesturing with the pointer. As for the present object selection process, the foregoing program modules and their ancillary procedures will now be described in more detail.

The object selection process requires a series of correction and normalization factors to be established before it can compute the orientation of the pointer from the raw sensor values provided in an orientation message. These factors are computed in a calibration procedure. The first part of this calibration procedure involves computing correction factors for each of the outputs from the magnetometer representing the three axes of the 3-axis device, respectively. Correction factors are needed to relate the magnetometer outputs, which are a measure of deviation from the direction of the Earth's magnetic field referred to as magnetic north (specifically the dot product of the direction each axis of the magnetometer is pointed with the direction of magnetic north), to the coordinate frame established for the environment in which the pointer is operating. The coordinate frame of the environment is arbitrary, but must be pre-defined and known to the object selection process prior to performing the calibration procedure. For example, if the environment is a room in a building, the coordinate frame might be establish such that the origin is in a corner with one axis extending vertically from the corner, and the other two horizontally along the two walls forming the corner.

Figure 9:
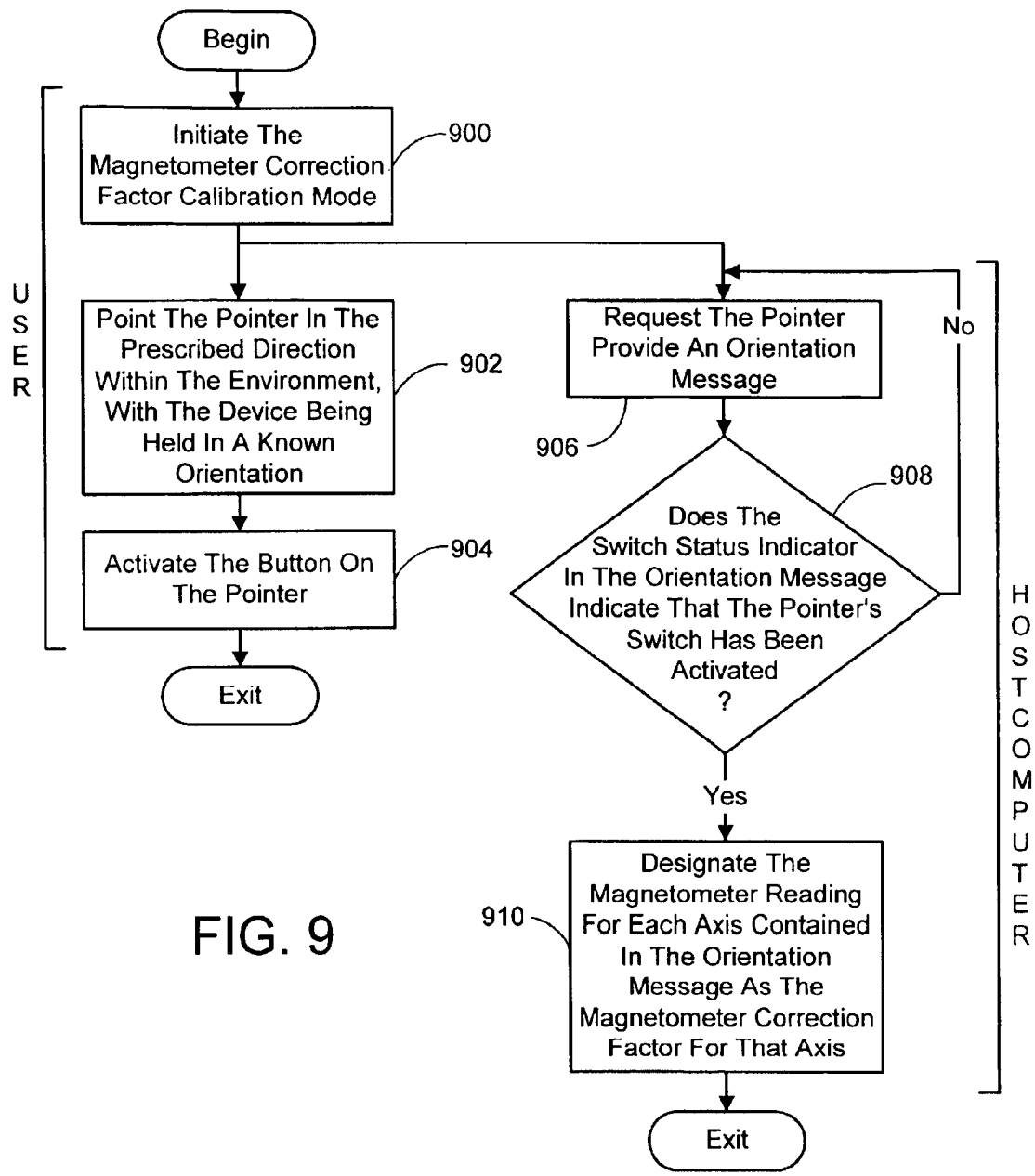
FIG. 9 is a flow chart diagramming a process for determining a set of magnetometer correction factors for use in deriving the orientation of the pointer performed as part of the overall process of FIG. 8.

Referring to FIG. 9, the magnetometer correction factors are computed by the user first indicating to the object selection process that a calibration reading is being taken, such as for instance, by the user putting the object selection process running on the host computer into a magnetometer correction factor calibration mode (process action 900). The user then points the pointer in a prescribed direction within the environment, with the device being held in a known orientation (process action 902). For example, for the sake of the user's convenience, the pre-determined direction might be toward a wall in the front of the room and the known orientation horizontal, such that a line extending from the end of the pointer intersects the front wall of the room substantially normal to its surface. If the pre-defined coordinate system of the environment is as described in the example above, then the pointer would be aligned with the axes of this coordinate system, thus simplifying the correction and normalization factor computations. The user activates the switch on the pointer when the device is pointed in the proper direction with the proper orientation (process action 904). Meanwhile, the object selection process requests the pointer provide an orientation message in the manner discussed previously (process action 906). The object selection process then inputs the orientation message transmitted by the pointer to determine if the switch status indicator indicates that the pointer's switch has been activated (process action 908). If not, the requesting and screening procedure continues (i.e., process actions 906 and 908 are repeated). However, when an orientation message is received in which the button indicator indicates the button has been depressed, then it is deemed that the sensor readings contained therein reflect those generated when the pointer is pointing in the aforementioned prescribed direction and with the prescribed orientation. The magnetometer readings contained in the orientation message reflect the deviation of each axis of the magnetometer from magnetic north within the environment and represent the factor by which each subsequent reading is offset to relate the readings to the environment's coordinate frame rather than the magnetometer axes. As such, in process action 910, the magnetometer reading for each axis is designated as the magnetometer correction factor for that axis.

Figure 10:
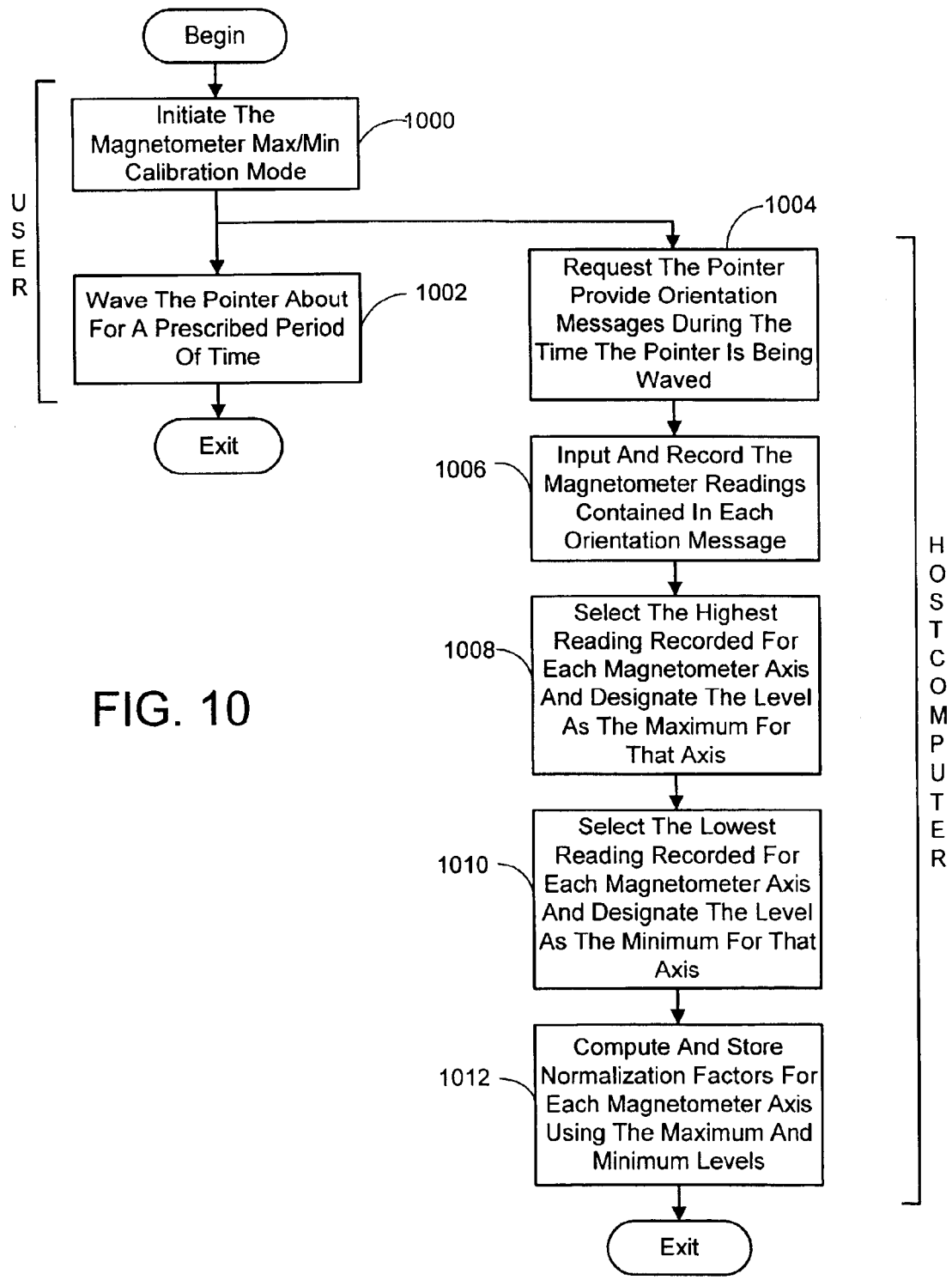
FIG. 10 is a flow chart diagramming a process for determining a set of magnetometer normalization factors for use in deriving the orientation of the pointer performed as part of the overall process of FIG. 8.

In addition to computing the aforementioned magnetometer correction factors, factors for range-normalizing the magnetometer readings are also computed in the calibration procedure. Essentially, these normalization factors are based on the maximum and minimum outputs that each axis of the magnetometer is capable of producing. These values are used later in a normalization procedure that is part of the process for determining the orientation of the pointer. A simple way of obtaining these maximum and minimum values is for the user to wave the pointer about while the outputs of the magnetometer are recorded by the host computer. Specifically, referring to FIG. 10, the user would put the object selection process running on the host computer in a magnetometer max/min calibration mode (process action 1000), and then wave the pointer about (process action 1002). Meanwhile, the object selection process requests the pointer to provide orientation messages in the normal manner (process action 1004). The object selection process then inputs and records the magnetometer readings contained in each orientation message transmitted by the pointer (process action 1006). This recording procedure (and presumably the pointer waving) continues for a prescribed period of time (e.g., about 1 minute) to ensure the likelihood that the highest and lowest possible readings for each axis are recorded. Once the recording procedure is complete, the object selection process selects the highest reading recorded for each axis of the magnetometer and designates these levels as the maximum for that axis (process action 1008). Similarly, the host computer selects the lowest reading recorded for each axis of the magnetometer and designates these levels as the minimum for that axis (process action 1010). Normalization factors are then computed via standard methods and stored for each magnetometer axis that convert the range represented by the maximum and minimum levels to a normalized range between 1.0 and −1.0 (process action 1012). These magnetometer normalization factors are used to normalize the actual readings from the magnetometer by converting the readings to normalized values between 1.0 and −1.0 during a normalization procedure to be discussed shortly. It is noted that the maximum and minimum values for an axis physically correspond to that axis of the magnetometer being directed along magnetic north and directly away from magnetic north, respectively. It is noted that while the foregoing waving procedure is very simple in nature, it worked well in tested embodiments of the object selection system and provided accurate results.

Factors for range-normalizing (in [−1, 1]) the accelerometer readings are also computed in the calibration procedure. In this case, the normalization factors are determined using the accelerometer output normalization procedures applicable to the accelerometer used, such as the conventional static normalization procedure used in tested embodiments of the present object selection process.

Figure 11A:
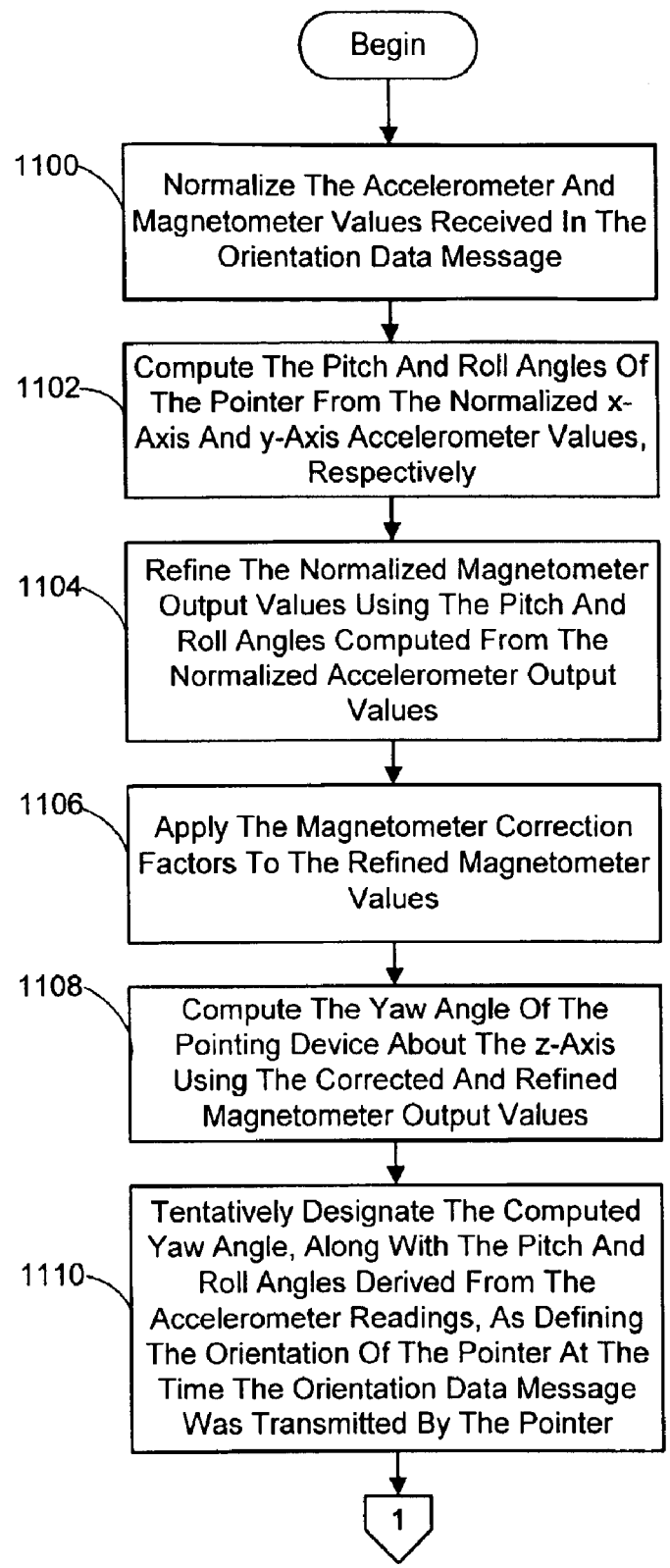
FIGS. 11A–B depict a flow chart diagramming the process for deriving the orientation of the pointer performed as part of the overall process of FIG. 8.

Once the calibration procedure is complete, the object selection process is ready to compute the orientation of the pointer each time an orientation data message is received by the host computer. The orientation of the pointer is defined in terms of its pitch, roll and yaw angle about the respective x, y and z axes of the environment's pre-defined coordinate system. These angles can be determined via various sensor fusion processing schemes that essentially compute the angle from the readings from the accelerometer and magnetometer of the pointer. Any of these existing methods could be used, however a simplified procedure was employed in tested versions of the present object selection system. In this simplified procedure, the yaw angle is computed using the recorded values of the magnetometer output. Even though the magnetometer is a 3-axis device, the pitch, roll and yaw angles cannot be computed directly from the recorded magnetometer values contained in the orientation data message. The angles cannot be computed directly because the magnetometer outputs a value that is the dot-product of the direction of each magnetometer sensor axis against the direction of magnetic north. This information is not sufficient to calculate the pitch, roll, and yaw of the device. However, it is possible to use the accelerometer readings in conjunction with the magnetometer outputs to compute the orientation. Specifically, referring to FIGS. 11A and B, the first action in the procedure is to normalize the magnetometer and accelerometer values received in the orientation message using the previously computed normalization factors to simplify the calculations (process action 1100). The pitch and roll angles of the pointer are then computed from the normalized x-axis and y-axis accelerometer values, respectively (process action 1102). Specifically, the pitch angle=−arcsin($a_1$), where $a_1$ is the normalized output of the accelerometer approximately corresponding to the rotation of the pointer about the x-axis of the environment's coordinate system, and the roll angle=−arcsin($a_2$) where $a_2$ is the normalized output of the accelerometer approximately corresponding to the rotation of the pointer about the y-axis of the environment's coordinate system. Next, these pitch and roll values are used to refine the magnetometer readings (process action 1104). Then, in process action 1106, the previously computed magnetometer correction factors are applied to the refined magnetometer values. Finally, the yaw angle is computed from the refined and corrected magnetometer values (process action 1108).

Specifically, the range-normalized accelerometer values representing the pitch and roll are used to establish the rotation matrix $R_{a1,a2,0}$, which represents a particular instance of the Euler angle rotation matrix $R_{\theta_x,\theta_y,\theta_z}$ that defines the composition of rotations about the x, y and z axes of the prescribed environmental coordinate system. Next, a 3-value vector m is formed from the range-normalized values output by the magnetometer. The pitch and roll then corrects the output of the magnetometer as follows:

$$m_{corected}=R_{a1,a2,0}m \qquad (1)$$

Let N be the output of the magnetometer when the pointer is held at (pitch, roll, yaw)=(0, 0, 0), as determined in the calibration procedure. Then, project onto the ground plane and normalize as follows:

$$m_{projected} = [1\ 1\ 0]^T m, N_{projected} = [1\ 1\ 0]^T N \qquad (2)$$

$$m_{normalized\&projected} = \frac{m_{projected}}{\|m_{projected}\|}, N_{normalized\&projected} = \frac{M_{projected}}{\|N_{projected}\|}$$

And finally, the yaw angle is found as follows:

$$yaw = sign(m_{np} \times N_{np}) \cos^{-1}(m_{np}{}^T N_{np}) \qquad (3)$$

The computed yaw angle, along with the pitch and roll angles derived from the accelerometer readings are then tentatively designated as defining the orientation of the pointer at the time the orientation data message was transmitted by the device (process action 1110).

It is noted that there are a number of caveats to the foregoing procedure. First, accelerometers only give true pitch and roll information when the pointer is motionless. This is typically not an issue except when the orientation computations are being used to determine if the pointer is being pointed directly at an object. In such cases, the problem can be avoided by relying on the orientation information only when the device is deemed to have been motionless when the accelerometer readings were captured. To this end, the orientation (i.e., pitch, roll and yaw) of the pointer is computed via the foregoing procedure for the last orientation message received. This is then compared to the orientation computed for the next to last orientation message received, to determine if the orientation of the pointer has changed significantly between the orientation messages. If the orientation of the pointer did not change significantly, then this indicates that the pointer was motionless prior to the transmission of the last orientation message. If the pointer was deemed to have been motionless, then the orientation information is used. However, if it is found that a significant change in the orientation occurred between the last two orientation messages received, it is deemed that the pointer was in motion and the orientation information computed from the last-received orientation message is ignored. Secondly, magnetic north can be distorted unpredictably in indoor environments and in close proximity to large metal objects. However, in practice, while it was found that for typical indoor office environments magnetic north did not always agree with magnetic north found outdoors, it was found to be fairly consistent throughout a single room. Thus, since the above-described magnetometer correction factors relate the perceived direction of magnetic north in the environment in which the pointer is operating to the prescribed coordinate system of that environment when the environment is a room, it will not make any difference if the perceived direction of magnetic north within the room matches that in any other room or outdoors, as the orientation of the pointer is computed for that room only. Finally, it should be noted that the foregoing computations will not provide accurate results if the perceived magnetic north in the environment happens to be co-linear to the gravity vector—a situation not likely to occur.

Figure 11B:
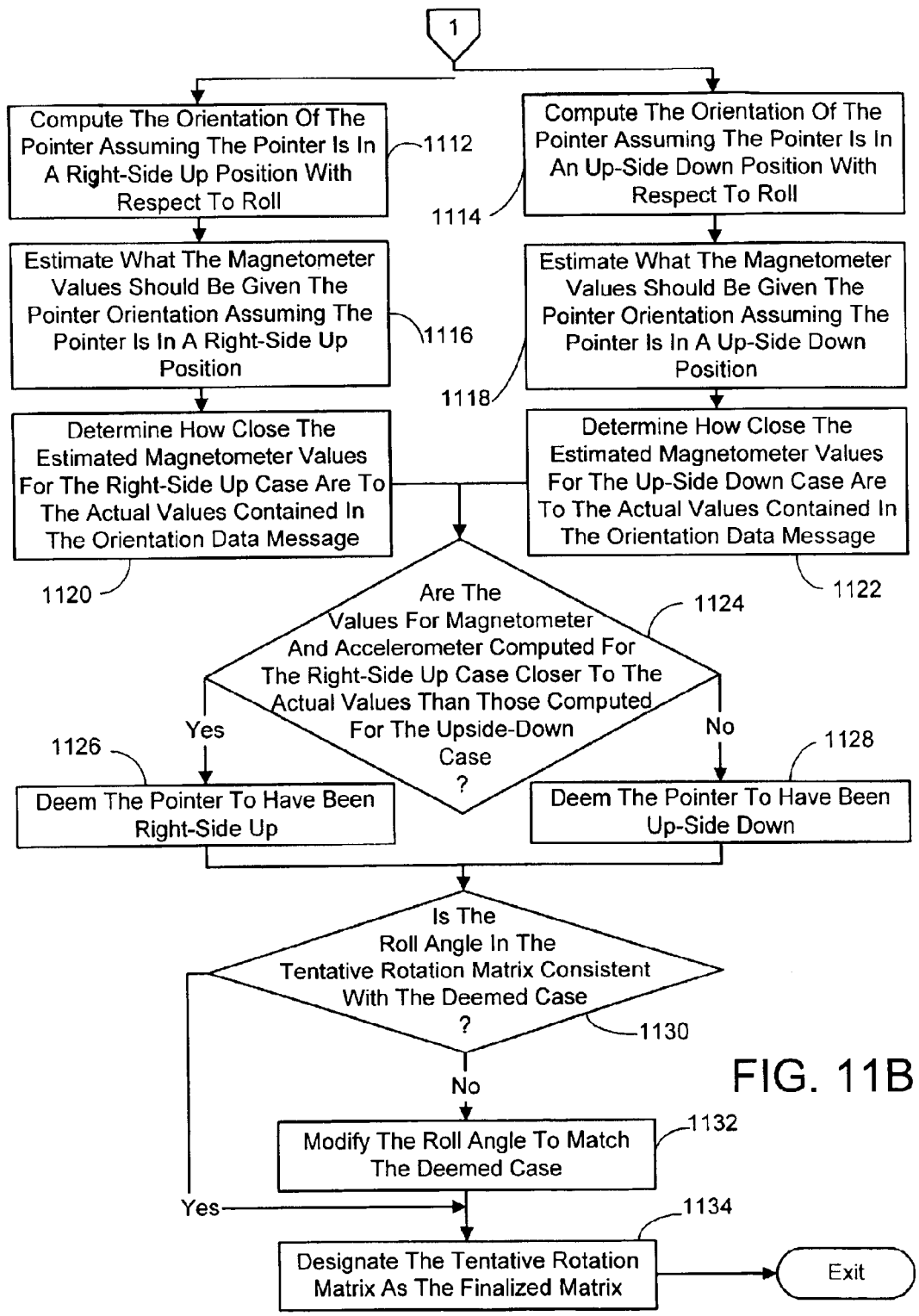

The foregoing designation of the pointer's orientation is tentative because it cannot be determined from the accelerometer reading used to compute the roll angle whether the device was in a right-side up, or upside-down position with respect to roll when the accelerometer outputs were captured for the orientation data message. Thus, the computed roll angle could be inaccurate as the computations assumed the pointer was right-side up. Referring now to FIG. 11B, this uncertainty can be resolved by computing the orientation assuming the pointer is right-side up (process action 1112) and then assuming the pointer is up-side down (process action 1114). Each solution is then used to compute an estimate of what the magnetometer outputs should be given the computed orientation (process actions 1116 and 1118). It is then determined for each case how close the estimated magnetometer values are to the actual values contained in the orientation message (process actions 1120 and 1122). It is next ascertained whether the estimated magnetometer values for the right-side up case are closer to the actual values than the estimated value for the upside-down case (process action 1124). If they are, then the pointer is deemed to have been right-side up (process action 1126). If, however, it is determined that the estimated magnetometer values for the right-side up case are not closer to the actual values than the estimated value for the upside-down case, then the pointer is deemed to have been up-side down (process action 1128). It is next determined if roll angle computed in the tentative rotation matrix is consistent with the deemed case (process action 1130). If it is consistent, the tentative rotation matrix is designated as the finalized rotation matrix (process action 1134). If, however, the tentative rotation matrix is inconsistent with the minimum error case, then the roll angle is modified (i.e., by 180 degrees) in process action 1132, and the modified rotation matrix is designated as the finalized rotation matrix (process action 1134).

One way to accomplish the foregoing task is to compute the orientation (R) as described above, except that it is computed first assuming the pitch angle derived from the accelerometer output reflects a right-side up orientation of the pointer, i.e., $Pitch_{right-side\ up} = -\arcsin(a)$ where a is the normalized output of the accelerometer approximately corresponding to the rotation of the pointer about the x-axis of the environment's coordinate system. The orientation is then computed assuming the pitch angle derived from the accelerometer output reflects an up-side down orientation of the pointer, i.e., $Pitch_{up-side\ down} = -\pi + \arcsin(a)$. A separate estimate of what the magnetometer outputs (m*) should be given the orientation computed for the right-side up condition and for the up-side down condition are then computed as follows:

$$m^* = R^T N_1 \qquad (4)$$

where N is the direction of magnetic north. m* is the estimated magnetometer output assuming the pointer is in the right-side up condition when R is the orientation computed assuming the pointer was in this condition, whereas m* is the estimated magnetometer output assuming the pointer is in the up-side down condition when R is the orientation computed assuming the pointer was in that condition. The error between the estimated magnetometer outputs (m*) and the actual magnetometer outputs (m) is next computed for both conditions, where the error is defined as $(m^*-M)^T(m^*-m)$. The pointer orientation associated with the lesser of the two error values computed is deemed to be the actual orientation of the pointer. It is noted that the roll angle derived from the accelerometer output could be used to perform as similar error analysis and determine the actual orientation of the pointer.

It is further noted that the 2-axis accelerometer used in the tested versions of the pointer could be replaced with a more complex 3-axis accelerometer, or an additional 1-axis accelerometer or mercury switch oriented in the appropriate direction could be employed, to eliminate the need for the foregoing error computation procedure. This would be possible because it can be determined directly from the "third"-axis readout whether the pointer was right-side up or upside-down with respect to roll. However, this change would add to the complexity of the pointer and must be weighed against the relatively minimal cost of the added processing required to do the error computation procedure.

Figure 12:
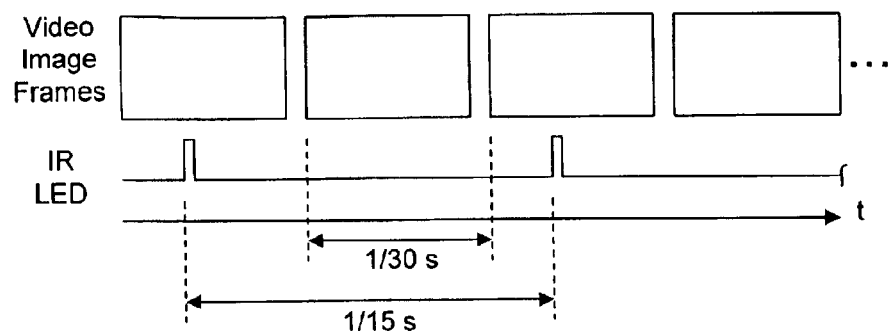
FIG. 12 is a timeline depicting the relative frequency of the production of video image frames by the video cameras of the system of FIG. 1 and the short duration flash of the IR LED of the pointer.
Figures 13A, 13B:
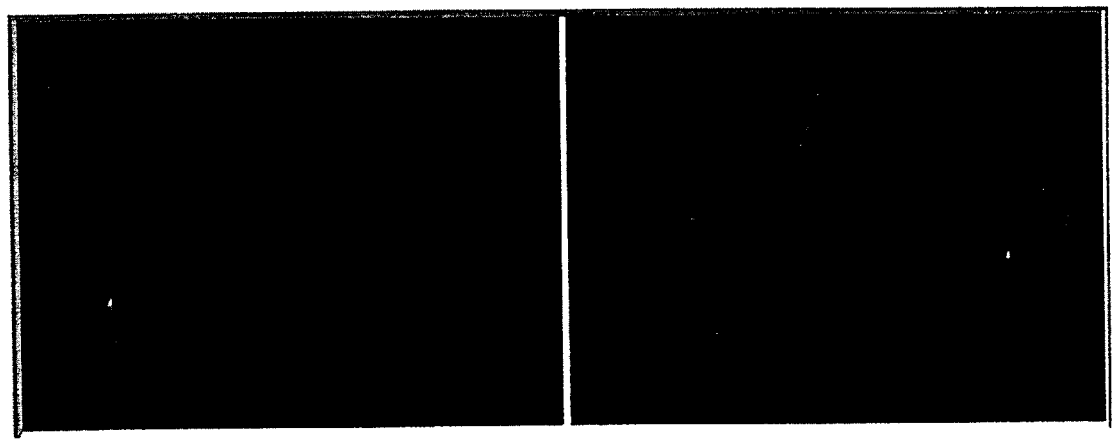
FIGS. 13A–B are images respectively depicting an office at IR frequencies from each of two IF pass-filtered video cameras, which capture the flash of the IR LED of the pointer.
Figures 13C, 13D:
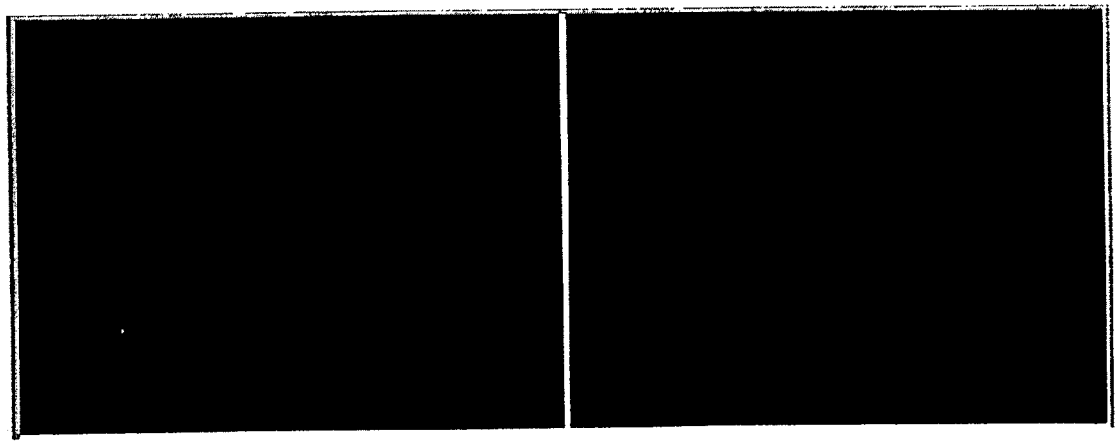
FIGS. 13C–D are difference images of the same office as depicted in FIGS. 13A–B where
Figure 14:
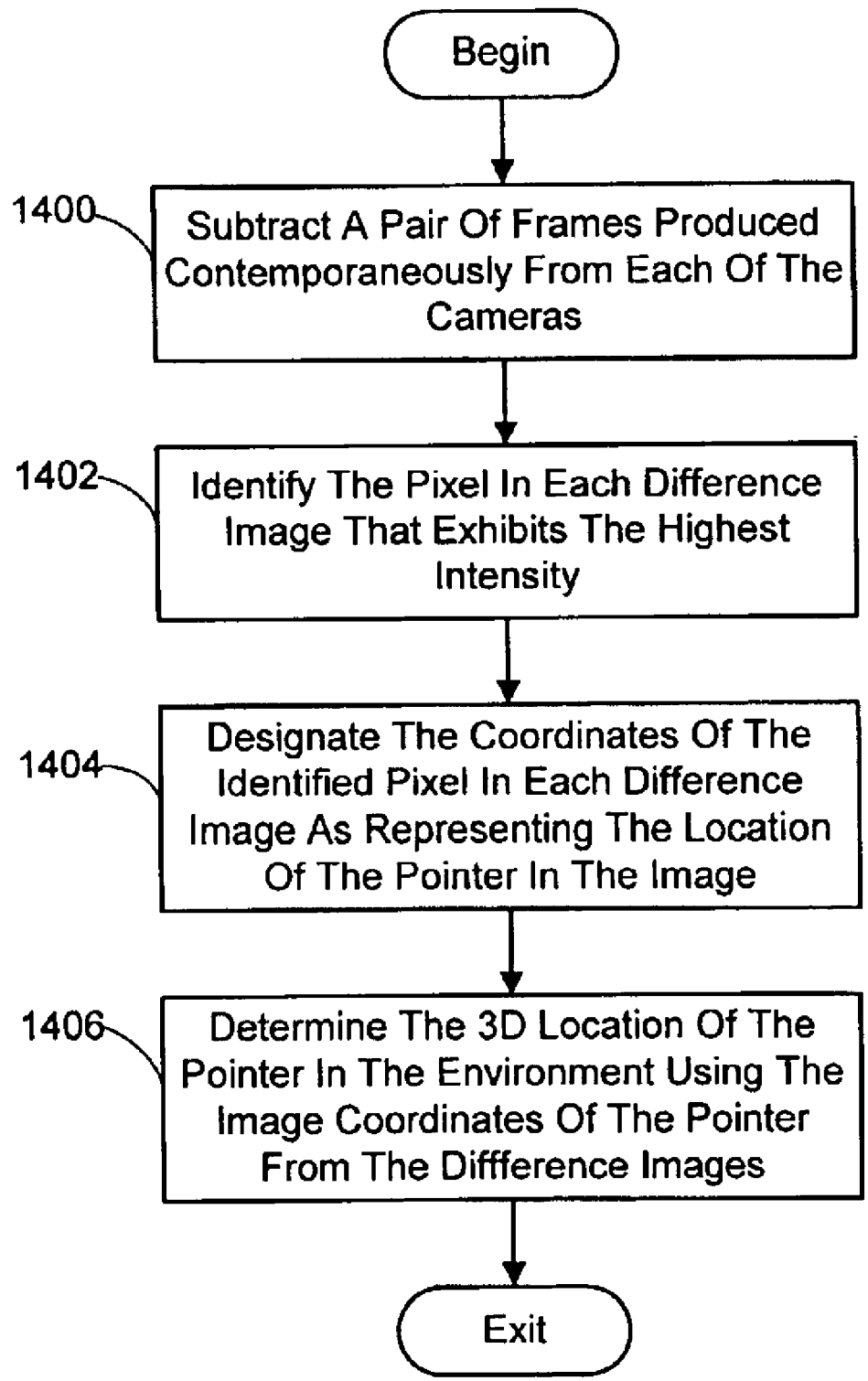
FIG. 14 depicts a flow chart diagramming the process for determining the location of the pointer performed as part of the overall process of FIG. 8.

As indicated previously, both the orientation and location of the pointer within the environment in which it is operating are needed to determine where the user is pointing the device. The position of the pointer within the environment can be determined via various methods, such as using conventional computer vision techniques [1] or ultrasonic acoustic locating systems [2, 3]. While these methods, and their like, could be used successfully, they are relatively complex and often require an expensive infrastructure to implement. A simpler, less costly process was developed for tested versions of the present system and will now be described. Specifically, the position of the pointer within the environment is determined with the aid of the two video camera having IR-pass filters. The cameras are calibrated ahead of time to the environment's coordinate system using conventional calibration methods to establish the camera parameters (both intrinsic and extrinsic) that will be needed to determine the 3D position of the pointing end of the pointer from images captured by the cameras. In operation, the aforementioned IR LED of the pointer is flashed for approximately 3 milliseconds at a rate of approximately 15 Hz by the device's microcontroller. Simultaneously, both cameras are recording the scene at 30 Hz. This means that the IR light in the environment is captured in $\frac{1}{30}^{th}$ of a second exposures to produce each frame of the video sequence produced each camera. Referring to the time line depicted in FIG. 12, it can be seen that the flash of the IR LED will be captured in every other frame of the video sequence produced by each camera due to the approximately 15 Hz flashing rate. Referring now to FIGS. 13A and B, images depicting the scene at IR frequencies and capturing the flash from the pointer are shown, as produced contemporaneously from each camera. As can be seen, the IR LED flash appears as a bright spot against a background lower intensity IR noise. Referring now to FIG. 14, the procedure for ascertaining the location to the pointer in terms of the pre-defined coordinate system of the environment will be described. First, the image coordinates of the IR LED flash are determined in each contemporaneously captured frame from the cameras that depicts the flash. This is accomplished by first performing a standard subtraction process on a contemporaneously produced pair of frames from each of the cameras (process action 1400). The resulting difference images represent the scene with most of the background IR eliminated and the IR LED flash the predominant feature in terms of intensity in the images, as shown in FIGS. 13C and D which depict the scene from the cameras captured in the image of FIGS. 13A & B respectively once the background IR is eliminated via the subtraction method. A standard peak detection procedure is then performed on the difference image computed from each pair of frames produced by each of the cameras (process action 1402). This peak detection procedure identifies the pixel in the difference image exhibiting the highest intensity. The image coordinates of this pixel are deemed to represent the location of the pointer in the image (process action 1404). Once the image coordinates of the pointer (as represented by the IF LED) are computed from a pair of images produced contemporaneously by each camera, standard stereo image techniques (typically involving triangulation) are employed to determine the 3D location of the pointer in the environment (process action 1406).

Once the pointer's location and orientation at a given point in time are known it is possible to determine where the user is pointing in anticipation of affecting an object in the vicinity. There are numerous methods that can be used to determine the pointed-to location and to identify the object at or near that location. In tested versions of the present system, a Gaussian blob scheme is employed to accomplish the foregoing task. This entails first modeling all the objects in the environment that it is desired for the user to be able to affect by pointing at it with the pointer, as 3D Gaussian blobs. In other words, the location and extent of the object is modeled as a single 3D Gaussian blob defined by the coordinates of a 3D location in the environment representing the mean $\mu$ of the blob and a covariance $\Sigma$ defining the outside edge of the blob. These multivariate Gaussians are probability distributions that are easily learned from data, and can coarsely represent an object of a given size and orientation.

Figure 15:
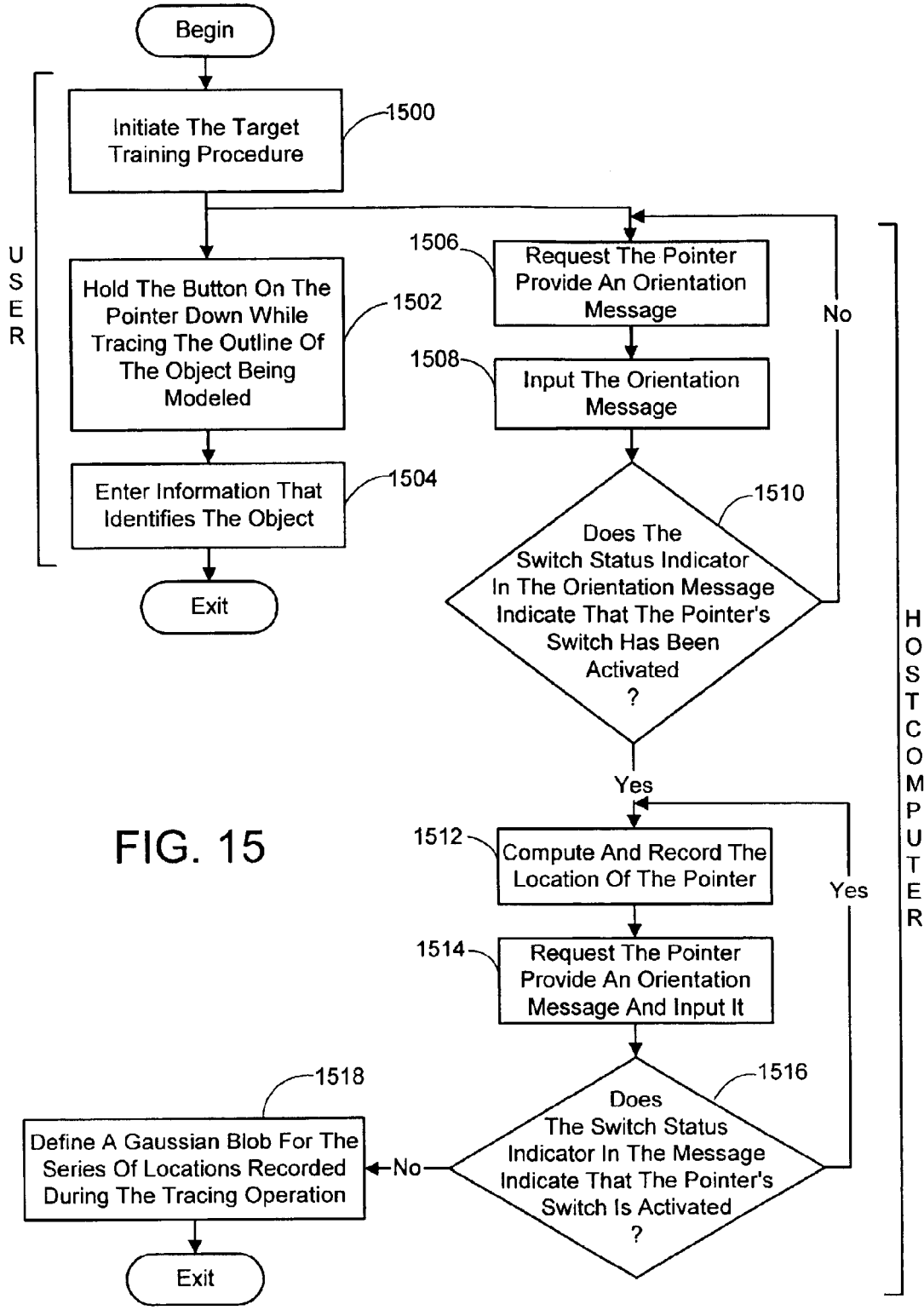
FIG. 15 is a flow chart diagramming a first process for using the object selection system of FIG. 1 to model an object in an environment, such as a room, as a Gaussian blob.

The modeling of the objects of interest in the environment as Gaussian blobs can be accomplished in any conventional manner. In tested versions of the object selection system, two different methods were employed. Referring to FIG. 15, the first involves the user initiating a target training procedure that is part of the object selection process (process action 1500), and then holding the button on the pointer down as he or she traces the outline of the object (process action 1502). In addition, the user enters information into the process that identifies the object being traced (process action 1504). Meanwhile, the target training procedure causes a request to be sent to the pointer directing it to provide an orientation message in the manner described previously (process action 1506). The orientation message transmitted by the pointer is inputted (process action 1508), and it is determined whether the button state indicator included in the message indicates that the pointer's button is activated (process action 1510). If not, process actions 1506 through 1510 are repeated. When, it is discovered that the button state indicator indicates the button is activated, then in process action 1512, the location of the pointer (as represented by the IR LED) is computed and recorded in the manner described above using the output from the video cameras. Next, a request is sent to the pointer directing it to provide an orientation message, and it is input when received (process action 1514). It is then determined whether the button state indicator still indicates that the pointer's button is activated (process action 1516). If so, process actions 1512 through 1516 are repeated. If, however, it is discovered that the button state indicator indicates the button is no longer activated, then it is deemed that the user has completed the tracing task and in process action 1518, a Gaussian blob is defined for the series of locations recorded during the tracing. Specifically, for recorded locations xi, the mean and covariance of these points is computed as follows:

$$\mu = \frac{1}{n}\sum_i x_i \tag{5}$$

$$\sum = \frac{1}{n}\sum_i (x_i - \mu)(x_i - \mu)^T$$

The computed mean and covariance define the Gaussian blob representing the traced object. This procedure can then be repeated for each object of interest in the environment.

An alternate, albeit somewhat more complex, method to model the objects of interest in the environment as Gaussian blobs was also employed in tested versions of the object selection process. This method has particular advantage when an object of interest is out of the line of sight of one or both of the cameras, such as if it were located near a wall below one of the cameras. Since images of the object from both cameras are needed to compute the pointers location, and so the points xi in the tracing procedure, the previously described target training method cannot be used unless both of the cameras can "see" the object.

Figure 16:
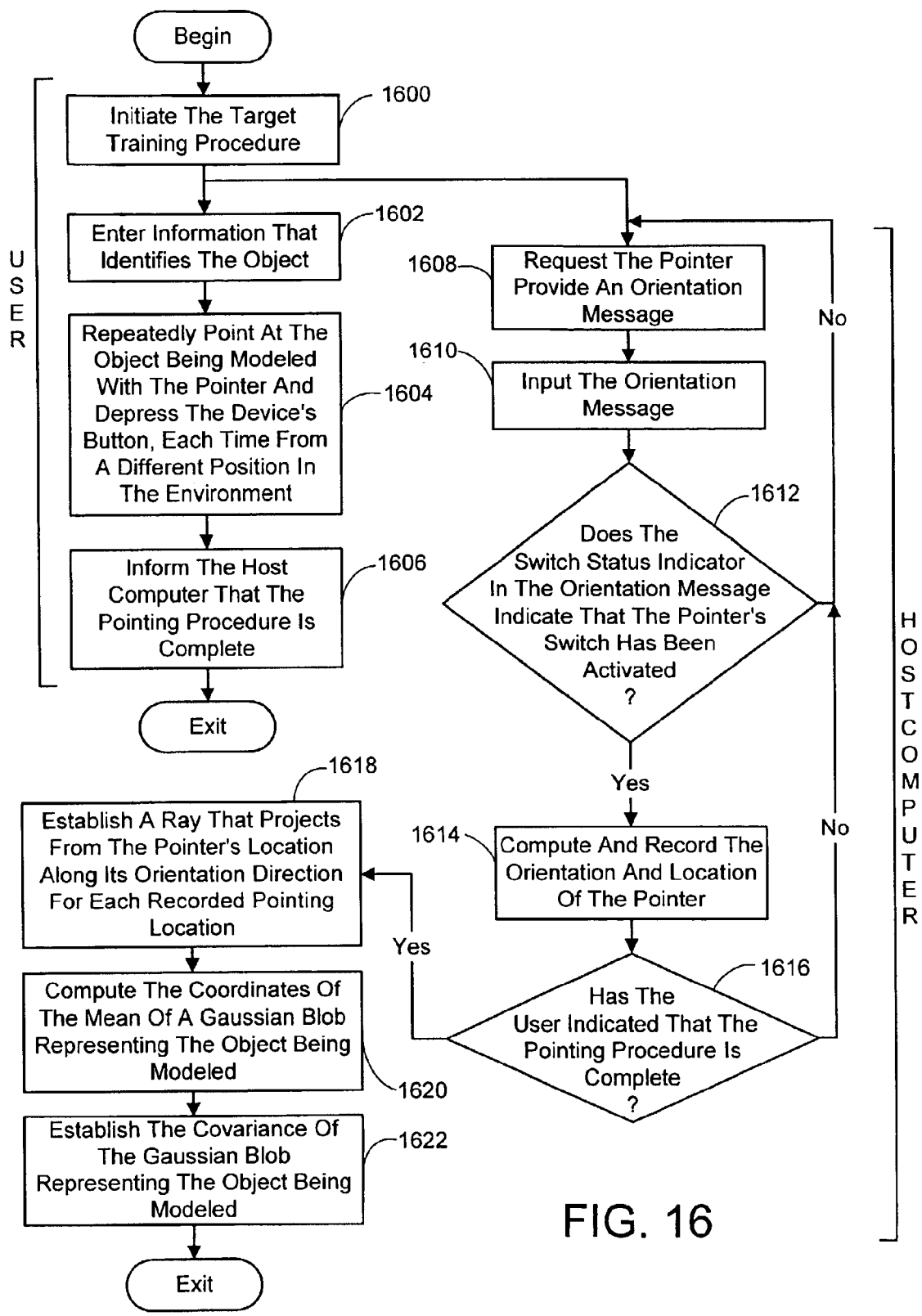
FIG. 16 is a flow chart diagramming an alternate process for using the object selection system of FIG. 1 to model an object in an environment as a Gaussian blob.

Referring to FIG. 16, this second target training method involves the user first initiating the training procedure (process action 1600), and then entering information identifying the object to be modeled (process action 1602). The user then repeatedly (i.e., at least twice) points at the object being modeled with the pointer and depresses the device's button, each time from a different position in the environment within the line of sight of both cameras (process action 1604). When the user completes the foregoing action at the last pointing location, he or she informs the host computer that the pointing procedure is complete (process action 1606). Meanwhile, the training procedure causes a request to be sent to the pointer directing it to provide an orientation message in the manner described previously (process action 1608). The orientation message transmitted by the pointer is inputted (process action 1610), and it is determined whether the button state indicator included in the message indicates that the pointer's button is activated (process action 1612). If not, process actions 1608 through 1612 are repeated. When, it is discovered that the button state indicator indicates the button is activated, then in process action 1614, the orientation and location of the pointer are computed and recorded using the procedures described previously. It is next determined if the user has indicated that the pointing procedure is complete (process action 1616). If not, process actions 1608 through 1616 are then repeated as appropriate. If, however, the pointing procedure is complete, a ray that projects through the environment from the pointer's location along the device's orientation direction is established for each recorded pointing location (process action 1618). Next, the coordinates of the point in the environment representing the mean of a Gaussian blob that is to be used to model the object under consideration, are computed (process action 1620). This is preferably accomplished as follows. For each pointing location:

$$x_i + s_i w_i = \mu \quad (6)$$

where $x_i$ is the position of the pointer at the $i^{th}$ pointing location, $w_i$ is the ray extending in the direction the pointer is pointed from the $i^{th}$ pointing location, and $s_i$ is an unknown distance to the target object. This defines a linear system of equations that can be solved via a conventional least squares procedure to find the mean location that best fits the data.

The covariance of the Gaussian blob representing the object being modeled is then established (process action 1622). This can be done in a number of ways. First, the covariance could be prescribed or user entered. However, in tested versions of the target training procedure, the covariance of the target object was computed by adding a minimum covariance to the spread of the intersection points, as follows:

$$\Sigma = \Sigma_0 + (x_i + s_i w_i - \mu)(x_i + s_i w_i - \mu)^T \quad (7)$$

It is noted that the aforementioned computations do not take into account that the accuracy in pointing with the pointer is related to the angular error in the calculation of the device's orientation (and so in the ray $w_i$). Thus, a computed pointing location that is far away from the object being modeled is inherently more uncertain than a computed pointing location which is nearby the target. Accordingly, the foregoing target training procedure can be refined by discounting the more remote pointing location to some degree in defining the Gaussian blob representing an object being modeled. This can be accomplished using a weighted least squares approach, as follows:

$$W_i(x_i + s_i w_i) = W_i \mu \quad (8)$$

$$W_i = \left(\frac{1}{c \hat{s}_i + \eta}\right)^2 I$$

where $W_i$ is the weight assigned to the $i^{th}$ pointing location, $\hat{s}_i$ is an estimate of the distance to the target object, possibly computed using the previous procedure employing the non-weighted least squares approach, c and $\eta$ are parameters related to the angular error of the pointer, and I is the identity matrix. As before, Eq. (8) is generated for each pointing location to define a linear system of equations that can be solved via the least squares procedure to find the mean location that best fits the data, but this time taking into consideration the angular error associated with the computed orientation of the pointer.

It is noted that the foregoing procedures for computing the mean and covariance of a Gaussian blob representing an object allow the represented shape of the object to be modified by simply adding any number of pointing locations where the pointer is pointed along the body of the target object.

Once a Gaussian blob for each object of interest in the environment has been defined, and stored in the memory of the host computer, the pointer can be used to select an object by simply pointing at it. The user can then affect the object, as mentioned previously. However, first, the processes that allow a user to select a modeled object in the environment using the pointer will be described. These processes are preformed each time the host computer receives an orientation message from the pointer.

One simple technique for selecting a modeled object is to evaluate the Gaussian distribution at a point nearest the mean of each Gaussian representing an object of interest in the environment which is intersected by the a ray cast by the pointer, along that ray. The likelihood that the pointer is being pointed a modeled object i is then:

$$l_i = g(x + \|\mu_i - x\| w; \Sigma_i) \quad (9)$$

where x is the position of the pointer (as represented by the IR LED), w is a ray extending from x in the direction the pointer is pointed, and $g(\mu;\Sigma)$ is the probability distribution function of the multivariate Gaussian. The object associated with the Gaussian blob exhibiting the highest probability l can then be designated as the selected object.

Another approach is to project each Gaussian onto a plane normal to either w or $\mu-x$, and then to take the value of the resulting 2D Gaussian at the point where the ray w intersects the plane. This approach can be accomplished as follows. Referring to FIG. 17, the ray that projects through the environment from the pointer's location along the device's orientation direction, is established (process action 1700). In addition, a line is defined between the mean point of each of the Gaussian blobs and the pointer's location (process action 1702). Next, for each Gaussian blob a plane normal to the line between the blob mean and the pointer's location, or alternately a plane normal to the ray, is then defined (process action 1704). Each Gaussian blob is then projected onto the associated plane using standard methods, to define a 2D Gaussian (process action 1706). The aforementioned ray is also projected onto each of these planes (process action 1708). This projection may be a point if the ray is normal to the plane or a line if it is not normal to the plane. For each projected Gaussian, the likelihood that the pointer is being pointed at the associated object is computed based on how far the origin of the projected Gaussian is from the closest point of projected ray using standard methods (process action 1710). Essentially, the shorter the distance between the origin of the projected Gaussian and the closest point of projected ray, the higher the probability that the pointer is being pointed at the object associated with the Gaussian. Thus, in process action 1712, the Gaussian blob having the highest probability is identified. At this point the Gaussian blob associated with the highest probability could be designated as the selected object. However, this could result in the nearest object to the direction the user is pointing being selected, even though the user may not actually be intending to select it. To prevent this situation, a thresholding procedure can be performed. Referring to FIG. 17 once again, this thresholding procedure involves determining if the probability computed for the Gaussian blob identified as having the highest probability exceeds a prescribed threshold (process action 1714). If the computed probability exceeds the threshold, then the object associated with the Gaussian blob exhibiting the highest probability is designated as being the object the user is pointing at (process action 1716). The threshold will vary depending on the environment, but generally should be high enough to ensure an object is actually being pointed at and that the user is not just pointing at no particular object. In this way, the process does not just pick the nearest object. Thus, if it is determined that the computed probability of the Gaussian blob identified as having the highest probability does not exceed the prescribed threshold, then no object is selected and the procedure ends. The foregoing procedure is then repeated upon receipt of the next orientation message, as indicated previously. It is noted that the thresholding procedure can also be applied to the first technique for selecting a modeled object, if desired.

It is further noted that the calculation associated with the weighted least squares approach described above can be adopted to estimate the average angular error of the pointer without reference to any ground truth data. This could be useful for correcting the computed pointer orientation direction. If this were the case, then the simpler non-weighted least squares approach could be employed in the alternate target object training procedure, as well as making the object selection process more accurate. The average angular error estimation procedure requires that the pointer be modified by the addition of a laser pointer, which is attached so as to project a laser beam along the pointing direction of the pointer. The user points at the object with the pointer from a position in the environment within the line of sight of both cameras, and depresses the device's button, as was done in the alternate target object training procedure. In this case, this pointing procedure is repeated multiple times at different pointing locations with the user being careful to line up the laser on the same spot on the surface of the target object. This eliminates any error due to the user's pointing accuracy. The orientation and location of the pointer at each pointing location is computed using the procedures described previously. The average angular error is then computed as follows:

$$\sum_i \frac{1}{n} \left| \cos^{-1}\left( w^T \frac{\mu - x_i}{\|\mu - x_i\|} \right) \right| \quad (10)$$

wherein i refers to the pointing location in the environment, n refers to the total number of pointing locations, w is a ray originating at the location of the pointing device and extending in a direction defined by the orientation of the device, x is the location of the pointing device, and $\mu$ is the location of the mean of the Gaussian blob representing the target object Without reference to ground truth position data, this estimate of error is a measure of the internal accuracy and repeatability of the pointer pointing and target object training procedures. This measure is believed to be more related to the overall performance of the pointer than to an estimate of the error in absolute position and orientation of the device, which is subject to, for instance, the calibration of the cameras to the environment's coordinate frame.

REFERENCES

1. Jojic, N., B. Brummitt, B. Meyers, S. Harris, and T. Huang, Estimation of Pointing Parameters in Dense Disparity Maps. in *IEEE Intl. Conf. on Automatic Face and Gesture Recognition*, (Grenoble, France, 2000).
2. Priyantha, N. B., Anit Chakraborty, Hari Balakrishnan, The Cricket Location-Support System. in *Proceedings 6th ACM MOBICOM*, (Boston, Mass., 2000).
3. Randell, C., and Henk Muller, Low Cost Indoor Positioning System. in *Ubicomp 2001: Ubiquitous Computing*, (Atlanta, Ga., 2001), Springer-Verlag, 42–48.

Wherefore, what is claimed is:

1. A system for selecting an object within an environment by a user pointing to the object with a pointing device, comprising:

a pointing device comprising a radio frequency (RF) transceiver and orientation sensors, wherein the outputs of the sensors are periodically packaged as orientation messages and transmitted using the RF transceiver;

a base station comprising a RF transceiver which receives orientation messages transmitted by the pointing device;

a pair of imaging devices each of which is located so as to capture images of the environment from different viewpoints;

a computing device which is in communication with the base station and the imaging devices so as to receive orientation messages forwarded to it by the base station and images captured by the imaging devices, and which computes the orientation and location of the pointer from the received orientation message and captured images, and which also selects an object in the environment whenever the pointing device is pointed at it using the orientation and location of the pointing device.

2. The system of claim 1, wherein the pointing device is a hand-held unit resembling a wand.

3. The system of claim 1, wherein the pointing device comprises:

a case having a pointing end a microcontroller;

said orientation sensors which comprise, an accelerometer which is connected to the microcontroller and provides separate x-axis and y-axis orientation signals, and a magnetometer which is connected to the microcontroller and provides separate x-axis, y-axis and z-axis orientation signals;

said RF transceiver which is connected to the microcontroller and which transmits the orientation messages whenever supplied to it by the microcontroller; and a power supply for powering the electronic components of the pointing device.

4. The system of claim 3, wherein the microcontroller package and transmits an orientation message at a prescribed rate.

5. The system of claim 3, wherein a command-response protocol is employed in regard to the transmission of orientation messages wherein the computing device periodically instructs the microcontroller to package and transmit an orientation message by causing the base station to transmit a request for the message to the pointing device which is provided via the pointing device's transceiver to the microcontroller.

6. The system of claim 5, wherein the computing device causes a request for an orientation message to be transmitted by the base station at a rate of approximately 50 times per second.

7. The system of claim 5, wherein the microcontroller periodically reads and stores the outputs of the orientation sensors, and wherein the orientation message generated by the microcontroller in response to a request for the same from the computing device comprises the last outputs read by the microcontroller from the accelerometer and magnetometer.

8. The system of claim 7, wherein the microcontroller reads and stores the outputs of the orientation sensors at a rate exceeding the polling rate at which the computing device requests orientation messages to be generated.

9. The system of claim 5, wherein the request for an orientation message comprises an identifier which has been assigned to the pointing device and is recognized by the microcontroller of the pointing device as indicating that the request is being directed at the pointing device, and wherein the microcontroller ignores any signal received that does not include said identifier.

10. The system of claim 9, wherein the orientation messages transmitted by the pointing device comprise said pointing device identifier so as to indicate to the computing device that the orientation message is from the pointing device.

11. The system of claim 3, wherein the pointing device further comprises a manually-operated switch which is connected to the microcontroller and which is activated and deactivated by the user for the purpose of instructing the computing device to implement a function, and wherein the state of the switch in regard to whether it is activated or deactivated at the time an orientation message is packaged for transmission is included in that orientation message.

12. The system of claim 3, wherein the pointing device further comprises a pair of visible spectrum light emitting diodes (LEDs) which are connected to the microcontroller and which are disposed so as to be visible when lit from the outside of the case, said visible spectrum LEDs being employ to provide status or feedback information to the user.

13. The system of claim 12, wherein the computing device instructs the pointing device's microcontroller to light one or both of the visible spectrum LEDs by causing the base station to transmit an command to the pointing device instructing the microcontroller to light one or both of the visible spectrum LEDs, said command being provided via the pointing device's transceiver to the microcontroller.

14. The system of claim 12, wherein the visible spectrum LEDs each emit a different color of visible light.

15. The system of claim 3, wherein the pointing device further comprises an infrared (IR) light emitting diode (LED) which is connected to the microcontroller and which is disposed so as to emit IR light when lit outside of the case, and wherein the microcontroller causes the IR LEDs to periodically flash.

16. The system of claim 15, wherein the IR LED is caused to flash for a duration of approximately 3 milliseconds at a rate of 15 flashes per second.

17. The system of claim 16, wherein each of said pair of imaging devices is a digital video camera having a IR pass filter which outputs video image frames that capture only IR light emitted or reflected in the environment toward the camera, including the emissions from the pointing device's IR LED.

18. The system of claim 17, wherein each of the cameras is fitted with a wide angle lens so as to capture a substantial portion of the environment in each video image frame.

19. The system of claim 3, wherein the orientation message further comprises error detection data computed by the microcontroller for use by the computing device to determine if a received orientation message is complete.

20. The system of claim 3, wherein the microcontroller periodically reads and stores the outputs of the orientation sensors, and wherein the microcontroller monitors the accelerometer outputs to determine if the pointing device is moving, and suspends operations whenever it determines the pointing device is not in motion for a prescribed period of time, so as to conserve power.

21. The system of claim 20, wherein the microcontroller determines whether the device has not been in motion for a prescribed period of time by comparing each new set of accelerometer outputs read to the last-stored output values and decrementing a countdown timer if the compared outputs are not substantially different, and then by checking whether the timer is equal to zero and if so powering down the pointing device.

22. The system of claim 21, wherein the microcontroller resets the countdown timer each time it is determined that the compared accelerometer outputs are substantially different.

23. The system of claim 22, wherein the countdown timer, if not reset, is decremented to zero in a period of time equal to approximately 10 minutes.

24. The system of claim 21, wherein whenever the pointing device has be powered down, the microcontroller wakes the device periodically, reads the outputs of the accelerometer, compares the new outputs to the last-stored) accelerometer output values, powers the pointing device back up and resets the countdown timer if the compared output readings differ significantly indicating that the pointing device is in motion, and powers the device back down if the compared output reading do not differ significantly indicating that the pointing device is still motionless.

25. The system of claim 3, wherein the power supply comprises a battery.

26. A computer-implemented process for selecting an object within an environment by a user pointing to the object with a pointing device, comprising using a computer to perform the following process actions:

inputting orientation sensor readings generated by orientation sensors of the pointing device and provided by the device in an orientation message;

deriving the orientation of the pointing device in relation to a predefined coordinate system of the environment from the inputted orientation sensor readings;

inputting digital video from a pair of video cameras each of which is located so as to capture images of the environment from different viewpoints;

ascertaining the location of the pointing device at a time substantially contemporaneous with the generation of the orientation message and in terms of the predefined coordinate system using the inputted digital video from the pair of video cameras;

using the orientation and location of the pointing device to determine whether the pointing device is being pointed at an object in the environment that is controllable by the computer; and whenever the pointing device is being pointed at a controllable object, selecting that object for future control actions.

27. The process of claim 26, wherein the orientation sensor readings comprise the outputs of a three-axis magnetometer, and wherein the process further comprises a process action of establishing correction factors to relate the magnetometer outputs to the predefined coordinate system of the environment prior to using them to derive the orientation of the pointing device.

28. The process of claim 27, wherein the process action of establishing correction factors to relate the magnetometer outputs to the predefined coordinate system of the environment, comprises the actions of:

initiating a magnetometer correction factor calibration mode;

pointing the pointing device in a prescribed direction within the environment with a known orientation so as to align the axes of the magnetometer with the axes of the predefined environmental coordinate system;

causing the pointing device to provide an orientation message and inputting the outputs of the magnetometer contained therein;

designating the output associated with each axis of the magnetometer as the correction factor for that axis, wherein the correction factor for each axis when applied to the output of the magnetometer associated with that axis converts the output from one indicating the deviation of the magnetometer axis under consideration from magnetic north to one indicating the deviation from the corresponding axis of the predefined environmental coordinate system.

29. The process of claim 28, wherein the orientation sensor readings comprise the outputs of a two-axis accelerometer and a three-axis magnetometer, and wherein the process further comprises process actions of establishing normalization factors to normalize the outputs of the accelerometer and magnetometer prior to using them to derive the orientation of the pointing device.

30. The process of claim 29, wherein the process action of establishing normalization factors to normalize the outputs of the magnetometer, comprises the actions of:

initiating a magnetometer normalization factor calibration mode;

moving the pointing device for prescribed period of time in a manner that causes excursions of the magnetometer about all three of its axes;

causing the pointing device to provide an orientation messages at prescribed intervals during the time the pointer is being moved;

inputting and recording the outputs of the magnetometer contained in each message provided;

at the end of the prescribed period of time,
determining for each axis of the magnetometer which recorded output value associated with that axis is the largest of the recorded output values, designating the recorded output value determined to be the largest for each axis of the magnetometer to be the maximum possible output value for that axis, determining for each axis of the magnetometer which recorded output value associated with that axis is the smallest of the recorded output values, designating the recorded output value determined to be the smallest for each axis of the magnetometer to be the minimum possible output value for that axis, and computing normalization factors of each axis of the magnetometer that based on the designated minimum and maximum possible outputs for that axis will convert an output from the magnetometer associated with the axis under consideration to a proportional value in a range from 1.0 to −1.0.

31. The process of claim 29, wherein the accelerometer and magnetometer of the pointing device are oriented therein such that their respective first axis corresponds to an x-axis which is directed laterally to a pointing axis of the pointing device and their respective second axis corresponds to a y-axis which is directed along the pointing axis of the pointing device and the third axis of the magnetometer correspond to a z-axis which is directed vertically upward whenever the pointing device is positioned right-side up with the x and y axes lying in a horizontal plane, and wherein the process action of deriving the orientation of the pointing device, comprises the actions of:

normalizing the accelerometer and magnetometer output values contained in the orientation message using the previously established normalization factors;

computing the angles defining the pitch of the pointing device about the x-axis and the roll of the device about the y-axis from the normalized outputs of the accelerometer;

refining the normalized magnetometer output values using the pitch and roll angles computed from the normalized accelerometer output values;

applying the correction factors previously established for each axis of the magnetometer to the refined magnetometer output values;

computing the yaw angle of the pointing device about the z axis using the corrected and refined magnetometer output values;

tentatively designate the computed pitch, roll and yaw angles as defining the orientation of the pointing device at the time the orientation message was generated;

assessing whether the pointing device was in a right-side up or up-side down position at the time the orientation message was generated;

whenever it is determined that the pointing device was in the right-side up position at the time the orientation message was generated, designating the previously computed pitch, roll and yaw angles as defining the finalized orientation of the pointing device; and whenever it is determined that the pointing device was in the up-side down position at the time the orientation message was generated, correcting the tentatively designated roll angle and designating the pitch, yaw and modified roll angle as defining the finalized orientation of the pointing device.

32. The process of claim 31, wherein the process action of assessing whether the pointing device was in a right-side up or up-side down position comprises the actions of:

computing the orientation of the pointer assuming the pointer is right-side up position with respect to roll;

computing the orientation of the pointer assuming the pointer is up-side down position with respect to roll;

estimating from the orientation of the pointer derived assuming the pointer is right-side up what the output values from the magnetometer should have been at the time the orientation message was generated;

estimating from the orientation of the pointer derived assuming the pointer is up-side down what the output values from the magnetometer should have been at the time the orientation message was generated;

determining whether the magnetometer output values estimated assuming the pointer was in the right-side up position or assuming the pointer was in the up-side down position exhibit the least amount of overall difference when compared to the actual output values contained in the orientation message;

whenever the output values computed for the right-side up position assumption are determined to exhibit the least amount of overall difference, deeming the pointing device to have been in the right-side up position at the time the orientation message was generated; and whenever the output values computed for the up-side down position assumption are determined to exhibit the least amount of overall difference, deeming the pointing device to have been in the up-side down position at the time the orientation message was generated.

33. The process of claim 31, wherein the pointing device further comprises a roll orientation sensor whose output is included in the orientation message and which directly indicates whether the pointing device is right-side up or up-side, and wherein the process action of assessing whether the pointing device was in a right-side up or up-side down position comprises an action of determining the position from the roll orientation sensor output.

34. The process of claim 31, further comprising, prior to performing the process action of computing the angles defining the pitch and roll of the pointing device from the normalized outputs of the accelerometer, performing the process actions of:

determining whether the pointing device has moved in the time between the generation of the orientation message currently under consideration and the generation of the immediately preceding orientation message; and whenever it is determined that the pointing device has moved in the time between the generation of said sequential orientation messages, ignoring the orientation message currently under consideration and waiting for the next orientation to be received.

35. The process of claim 34, wherein the process action of determining whether the pointing device has moved, comprises the process actions of:

determining whether the orientation of the pointing device computed from the orientation message currently under consideration is significantly different from that computed from the orientation message received just before the current message;

deeming that the pointing device has moved whenever the orientation of the pointing device computed from the orientation message currently under consideration is significantly different from that computed from the orientation message received just before the current message; and deeming that the pointing device has not moved whenever the orientation of the pointing device computed from the orientation message currently under consideration is not significantly different from that computed from the orientation message received just before the current message.

36. The process of claim 26, wherein the pointing device comprises an infrared (IR) light emitting diode (LED) which is disposed so as to emit IR light when lit outside of the case and which flashes for a prescribed duration at a prescribed rate, and wherein the pair of video cameras each capture video image frames at a rate approximately twice the prescribed flashing rate of the pointing device's IR LED and each have an IR pass filter which causes the cameras to output video image frames that capture only IR light emitted or reflected in the environment toward the camera including the emissions from the pointing device's IR LED, and wherein the process action of ascertaining the location of the pointing device using the inputted digital video from the pair of video cameras, comprises the actions of:

for each video camera and each pair of video image frames produced by thereby, subtracting the pair of frames to produce a difference image, said difference image depicting substantially only the IR emissions and reflections directed toward the camera which appear in one or the other of the pair of frames but not both including the flash from the IR LED of the pointing device as it flashes at a rate approximately one-half the rate at which the image frames are captured and so will appear in only one of each pair of frames produced by the camera, and wherein said flash is presumed to be the predominate feature in the difference image, and identifying the image coordinates of the pixel in the difference image that exhibits the highest intensity using a peak detection procedure; and for each pair of approximately contemporaneous pairs of image frames generated by the pair of cameras, determining the 3D coordinates of the flash within the predefined environmental coordinate system using the image coordinates of the flash identified in the difference images associated with said approximately contemporaneous pair of image frames generated by the pair of cameras and predetermined intrinsic and extrinsic camera parameters employing a stereo image technique.

37. The process of claim 26 wherein the process action of using the orientation and location of the pointing device to determine whether the pointing device is being pointed at an object in the environment that is controllable by the computer, comprises action of:

modeling the location and extent of objects within the environment that are controllable by the computer using 3D Gaussian blobs defined by a location of the mean of the blob in terms of its environmental coordinates and a covariance;

for each Gaussian blob, projecting the Gaussian blob onto a plane which is normal to either a line extending from the location of the pointing device to the mean of the blob or a ray originating at the location of the pointing device and extending in a direction defined by the orientation of the device, ascertaining the value of the resulting projected Gaussian blob at a point where the ray intersects the plane, said value representing the probability that the pointing device is pointing at the object associated with the projected Gaussian blob;

identifying which of the probability values associated with the projected Gaussian blobs is the largest, if any;

determining if a probability value identified as the largest exceeds a prescribed minimum probability threshold; and whenever it is determined that the probability value identified as the largest exceeds the prescribed minimum probability threshold, designating the object associated with the projected Gaussian blob from which the probability value was derived as being the object that the pointing device is pointing at.

38. The process of claim 37 wherein the process action of modeling the location and extent of objects within the environment that are controllable by the computer using 3D Gaussian blobs, for each object to be modeled in the environment, comprises the actions of:

the user,
inputting information identifying the object that is to be modeled, and
activating a switch on the pointing device, tracing the outline of the object, then deactivating the switch; and
performing a target training procedure comprising,
causing requests for orientation messages to be sent to the pointing device a prescribed request rate,
inputting each orientation message received from the pointing device;
for each orientation message input, determining whether a switch state indictor included in the orientation message indicates that the switch is activated;
whenever it is initially determined that the switch is not activated, continuing the switch state determination action for each subsequent orientation message received until an orientation message is received which indicates that the switch is activated;
whenever it is determined that the switch is activated, ascertaining and storing the location of the pointing device using the inputted digital video from the pair of video cameras and continuing the switch state determination action for each subsequent orientation message received;
whenever it is determined that the switch has been deactivated after having been determined to be activated in the immediately preceding orientation message, deeming the tracing action to be complete and defining a 3D Gaussian blob representing the object from the previously ascertained pointing device locations stored during the tracing action.

39. The process of claim 37, wherein the process action of modeling the location and extent of objects within the environment that are controllable by the computer using 3D Gaussian blobs, comprises for each object to be modeled in the environment, the actions of:

the user,
inputting information identifying the object that is to be modeled,
repeatedly pointing the pointing device at the object being modeled and momentarily activating a switch on the pointing device, each time pointing the device from a different location within the environment, and
indicating that the target training inputs are complete; and
performing a target training procedure comprising,
causing requests for orientation messages to be sent to the pointing device a prescribed request rate,
inputting each orientation message received from the pointing device until the user indicates the target training inputs are complete
for each orientation message input, determining whether a switch state indictor included in the orientation message indicates that the switch is activated;
whenever it is determined that the switch is activated, ascertaining the orientation of the pointing device using orientation sensor readings included in the orientation message and ascertaining the location of the pointing device using the inputted digital video from the pair of video cameras, and storing the orientation and location values;
computing the location of the mean of a 3D Gaussian blob representing the object being modeled from the pointing device's stored orientation and location values computed for the multiple pointing locations,
establishing the covariance of the Gaussian blob based on one of (i) a prescribed covariance, (ii) a user-input covariance, or (iii) a covariance computed by adding a minimum covariance to the spread of the intersection points of rays defined by the pointing device's stored orientation and location values computed for the multiple pointing locations.

40. The process of claim 39, wherein the process action of computing the location of the mean of the 3D Gaussian blob, comprises the actions of:

for each pointing location where the orientation and location of the pointing device have been ascertained, establishing a ray that projects through the environment from the pointing device's location along the direction of the device's orientation;
forming a linear system of equations, wherein a separate equation is created for each pointing location that defines the location of the mean of a 3D Gaussian blob as a function of the location of the pointing device, the ray and an unknown distance between the location of the pointing device and the object being modeled along the direction of the ray;
solving the system of equation using a least squares approach to find the location of the mean that best fits the equations.

41. The process of claim 40, wherein the accuracy of the ray direction is a function of the distance between the location of the pointing device and the object being modeled, and wherein each equation in the system of equations is weighted so as to make equations associated with a pointing location that is closer to the object to have a greater weight in determining the location of the mean, than equations associated with a pointing location that is further away from the object.

42. The process of claim 39, wherein the process action of the user repeatedly pointing the pointing device at the object being modeled from a different location within the environment and momentarily activating the switch on the pointing device, comprises an action of pointing the pointing device at a different point along the body of the object each time.

43. The process of claim 31, wherein the pointing device further comprises a laser pointer disposes so as to project a laser beam along the pointing direction of the pointing device, and wherein the process action of establishing correction factors to relate the magnetometer outputs to the predefined coordinate system of the environment, comprises the actions of:

modeling the location and extent of an object within the environment using a 3D Gaussian blob defined by a location of the mean of the blob in terms of its environmental coordinates and a covariance;
initiating a pointing device angular error estimation mode;
having the user repeatedly pointing the pointing device at the same point on the modeled object and momentarily activating a switch on the pointing device, each time pointing the device from a different location within the environment;

causing requests for orientation messages to be sent to the pointing device a prescribed request rate;

inputting each orientation message received from the pointing device;

for each orientation message input, determining whether a switch state indictor included in the orientation message indicates that the switch is activated;

whenever it is determined that the switch is activated, ascertaining the orientation of the pointing device using orientation sensor readings included in the orientation message and ascertaining the location of the pointing device using the inputted digital video from the pair of video cameras, and storing the orientation and location values;

computing the average angular error of the pointing device as, $$\sum_i \frac{1}{n} \left| \cos^{-1}\left(w^T \frac{\mu - x_i}{\|\mu - x_i\|}\right) \right|$$

wherein i refers to the pointing location in the environment, n refers to the total number of pointing locations, w is a ray originating at the location of the pointing device and extending in a direction defined by the orientation of the device, x is the location of the pointing device, and $\mu$ is the location of the mean of the Gaussian blob representing the modeled object.

* * * * *